US012739812B2

(12) United States Patent
Zhou et al.

(10) Patent No.: US 12,739,812 B2
(45) Date of Patent: Sep. 15, 2026

(54) COMMUNICATION USING A DEFAULT COMMON BEAM

(71) Applicant: QUALCOMM Incorporated, San Diego, CA (US)

(72) Inventors: Yan Zhou, San Diego, CA (US); Fang Yuan, Beijing (CN); Wooseok Nam, San Diego, CA (US); Tao Luo, San Diego, CA (US); Jelena Damnjanovic, Del Mar, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/258,982

(22) PCT Filed: Jan. 9, 2021

(86) PCT No.: PCT/CN2021/070984

§ 371 (c)(1),
(2) Date: Jun. 22, 2023

(87) PCT Pub. No.: WO2022/147806

PCT Pub. Date: Jul. 14, 2022

(65) Prior Publication Data

US 2024/0073880 A1 Feb. 29, 2024

(51) Int. Cl.

| | |
|---|---|
| *H04W 72/0446* | (2023.01) |
| *H04L 5/00* | (2006.01) |
| *H04W 72/044* | (2023.01) |
| *H04W 72/0453* | (2023.01) |
| *H04W 88/08* | (2009.01) |

(52) U.S. Cl.
CPC ......... *H04W 72/046* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 2019/0261338 | A1 | 8/2019 | Akkarakaran et al. | |
| 2020/0196351 | A1 | 6/2020 | Zhou et al. | |
| 2021/0152232 | A1 * | 5/2021 | Kela | H04W 52/0225 |

(Continued)

FOREIGN PATENT DOCUMENTS

| | | | | | |
|---|---|---|---|---|---|
| CN | 109803427 | A | | 5/2019 | |
| CN | 110365458 | A | | 10/2019 | |
| CN | 111149306 | A | * | 5/2020 | H04B 7/088 |

OTHER PUBLICATIONS

Futurewei (R1-2007546, Oct. 26-Nov. 13, 2020) (Year: 2020).*

(Continued)

*Primary Examiner* — Maharishi V Khirodhar
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive, from a base station, information relating to one or more transmissions to be transmitted or received by the UE. The UE may communicate with the base station using a default common beam for the one or more transmissions. Numerous other aspects are described.

35 Claims, 17 Drawing Sheets

(56) References Cited

U.S. PATENT DOCUMENTS

2022/0322325 A1* 10/2022 Svedman .............. H04W 36/00
2023/0403108 A1* 12/2023 Grossmann ........... H04L 5/0091

OTHER PUBLICATIONS

International Search Report and Written Opinion—PCT/CN2021/070984—ISA/EPO—Sep. 29, 2021.
Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, Aug. 25, 2020, 27 Pages, sections 1-2, section 4.1, Appendix A.
3GPP TSG RAN WG1 Meeting #103-e, e-Meeting, Oct. 26-Nov. 13, 2020 "Session notes for 8.1 (Further enhancements on MIMO for NR)", 18 Pages, pp. 1, 4, 5.

* cited by examiner

400

900

COMMUNICATION USING A DEFAULT COMMON BEAM

CROSS-REFERENCE TO RELATED APPLICATION

This Patent Application is a 371 national stage of PCT Application No. PCT/CN2021/070984 filed on Jan. 9, 2021, entitled "COMMUNICATION USING A DEFAULT COMMON BEAM," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for using a default beam.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a user equipment (UE) for wireless communication includes a memory and one or more processors coupled to the memory. The memory and the one or more processors may be configured to receive, from a base station, information relating to one or more transmissions to be transmitted or received by the UE. The memory and the one or more processors may be configured to communicate with the base station using a default common beam for the one or more transmissions.

In some aspects, a base station for wireless communication includes a memory and one or more processors coupled to the memory. The memory and the one or more processors configured to transmit, to a UE, information relating to one or more transmissions to be transmitted or received by the UE. The memory and the one or more processors configured to communicate with the UE using a default common beam for the one or more transmissions.

In some aspects, a method of wireless communication performed by a UE may include receiving, from a base station, information relating to one or more transmissions to be transmitted or received by the UE. The method may include communicating with the base station using a default common beam for the one or more transmissions.

In some aspects, a method of wireless communication performed by a base station may include transmitting, to a UE, information relating to one or more transmissions to be transmitted or received by the UE. The method may include communicating with the UE using a default common beam for the one or more transmissions.

In some aspects, a non-transitory computer-readable medium storing a set of instructions for wireless communication includes one or more instructions that, when executed by one or more processors of a UE, may cause the UE to receive, from a base station, information relating to one or more transmissions to be transmitted or received by the UE. The one or more instructions, when executed by the one or more processors of the UE, may cause the UE to communicate with the base station using a default common beam for the one or more transmissions.

In some aspects, a non-transitory computer-readable medium storing a set of instructions for wireless communication includes one or more instructions that, when executed by one or more processors of a base station, may cause the base station to transmit, to a UE, information relating to one or more transmissions to be transmitted or received by the UE. The one or more instructions, when executed by the one or more processors of the base station, may cause the base station to communicate with the UE using a default common beam for the one or more transmissions.

In some aspects, an apparatus for wireless communication includes means for receiving, from a base station, information relating to one or more transmissions to be transmitted or received by the apparatus. The apparatus may include means for communicating with the base station using a default common beam for the one or more transmissions.

In some aspects, an apparatus for wireless communication includes means for transmitting, to a UE, information relating to one or more transmissions to be transmitted or received by the UE. The apparatus may include means for communicating with the UE using a default common beam for the one or more transmissions.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
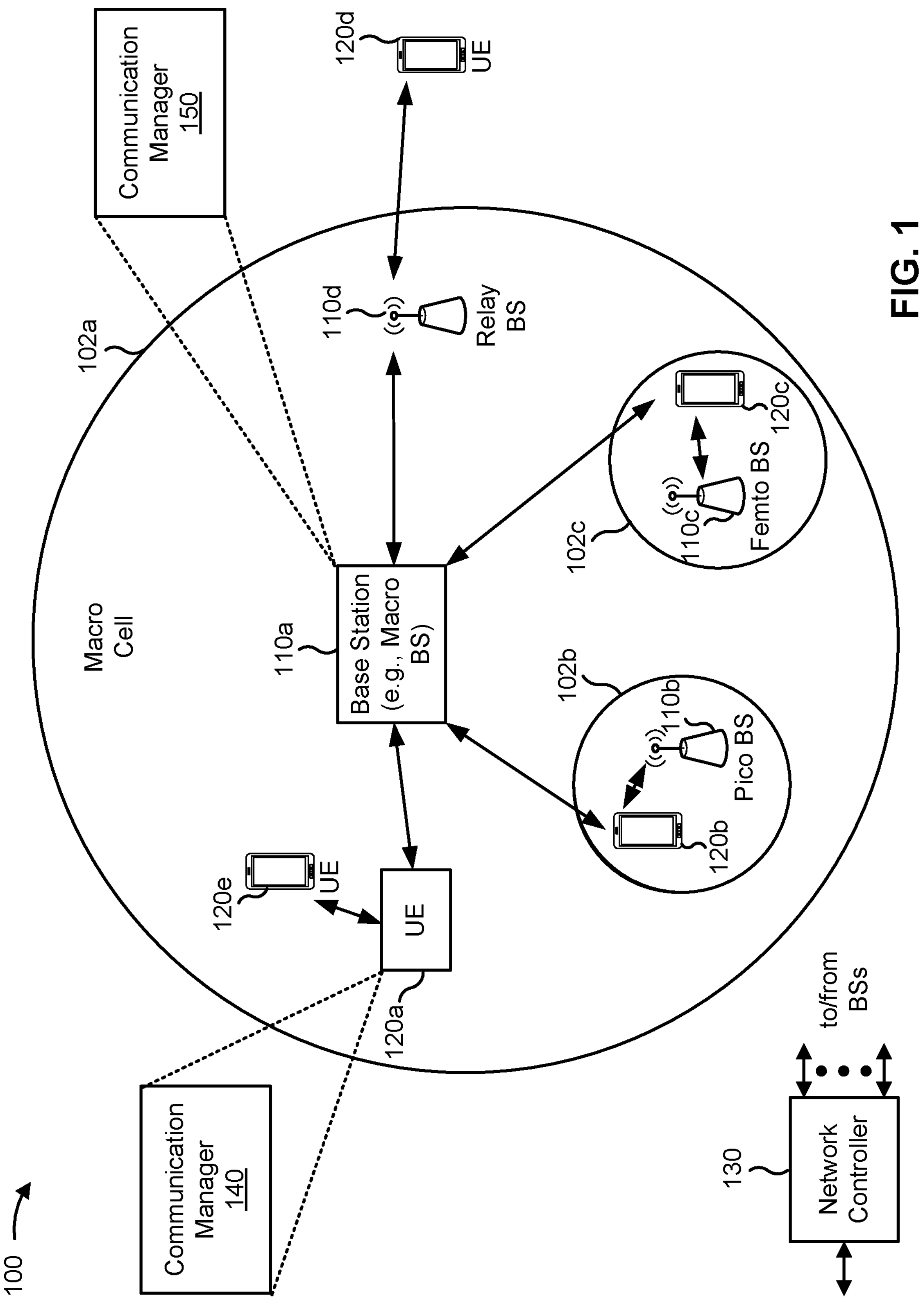
FIG. 1 is a diagram illustrating an example of a wireless network, in accordance with various aspects of the present disclosure.

Beamforming includes generation of a beam using multiple signals on different antenna elements. A base station and a user equipment (UE) may be configured for beamformed communications. Beamformed communications between the base station and the UE may be facilitated by one or more beam refinement procedures. For example, the base station may configure the UE to measure and report channel condition values of different beams so that the base station may identify one or more beams (e.g., best beams) for use in communications between the base station and the UE. Using beamforming, for example, the base station may transmit in the direction of the UE using a directional transmit beam, and the UE may receive the transmission using a directional receive beam. In other words, the base station and the UE may communicate using a beam pair link that includes a pair of corresponding downlink/uplink beams. In one or more examples, a beam pair link may become misaligned (e.g., because the UE failed to receive a command to change beams from the base station). For example, the base station may transmit a communication to the UE using a transmit beam that does not correspond to a receive beam used by the UE to receive the communication.

In one or more examples, the UE and the base station may communicate using common beams (e.g., using a common beam pair link). A common beam may refer to a beam for use in transmitting and/or receiving multiple channels and/or reference signals. For example, the UE may use a common beam for reception on a downlink channel and for transmission on an uplink channel. The base station may indicate (e.g., in downlink control information (DCI)) a common beam for the UE using a common beam transmission configuration indicator (TCI) state.

In one or more examples, a common beam pair link between the base station and the UE may become misaligned, as described above. In addition, there may be periods of limited traffic between the base station and the UE, such that common beam refinement is not feasible. As a result, a common beam indicated for the UE may become unsuitable for communications between the base station and the UE.

In some aspects, the UE and the base station may communicate using default common beams, such as when an indicated common beam is unsuitable, as described above. A default common beam may refer to a common beam that is to be used instead of an indicated (e.g., in DCI) common beam. In some aspects, the UE and/or the base station may switch from using an indicated common beam to using a default common beam based at least in part on an expiration of an inactivity timer. For example, the UE and the base station may initiate respective inactivity timers (e.g., at the start of a period of no traffic between the base station and the UE), and the UE and the base station may switch to a default common beam upon expiration of the inactivity timers (e.g., if there was no traffic between the base station and the UE before the expiration). In one or more examples, a default common beam may be a wide beam (e.g., a multidirectional beam or an omnidirectional beam), whereas the indicated common beam may be a narrow beam (e.g., a single directional beam). Thus, the default common beam is therefore more robust to UE movement than the indicated common beam. Accordingly, in one or more examples, a default common beam may enable communication between the UE and the base station in the absence of beam refinement aided by traffic between the UE and the base station. In addition, a default common beam may provide an aligned beam pair at the UE and base station, thereby resolving a misaligned beam pair link.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a customer premises equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a “sub-6 GHz” band. Similarly, FR2 is often referred to as a “millimeter wave” band despite being different from the extremely high frequency (EHF) band (30 GHz-300 GHz) which is identified by the International Telecommunications Union (ITU) as a “millimeter wave” band. Thus, unless specifically stated otherwise, it should be understood that the term “sub-6 GHz” or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term “millimeter wave” or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may receive, from a base station, information relating to one or more transmissions to be transmitted or received by the UE, and communicate with the base station using a default common beam for the one or more transmissions. Additionally, or alternatively, the communication manager 140 may perform one or more other operations described herein.

In some aspects, the base station 110 may include a communication manager 150. As described in more detail elsewhere herein, the communication manager 150 may transmit, to a UE, information relating to one or more transmissions to be transmitted or received by the UE, and communicate with the UE using a default common beam for the one or more transmissions. Additionally, or alternatively, the communication manager 150 may perform one or more other operations described herein.

As indicated above, FIG. 1 is provided merely as an example. Other examples may differ from what is described with regard to FIG. 1.

Figure 2:
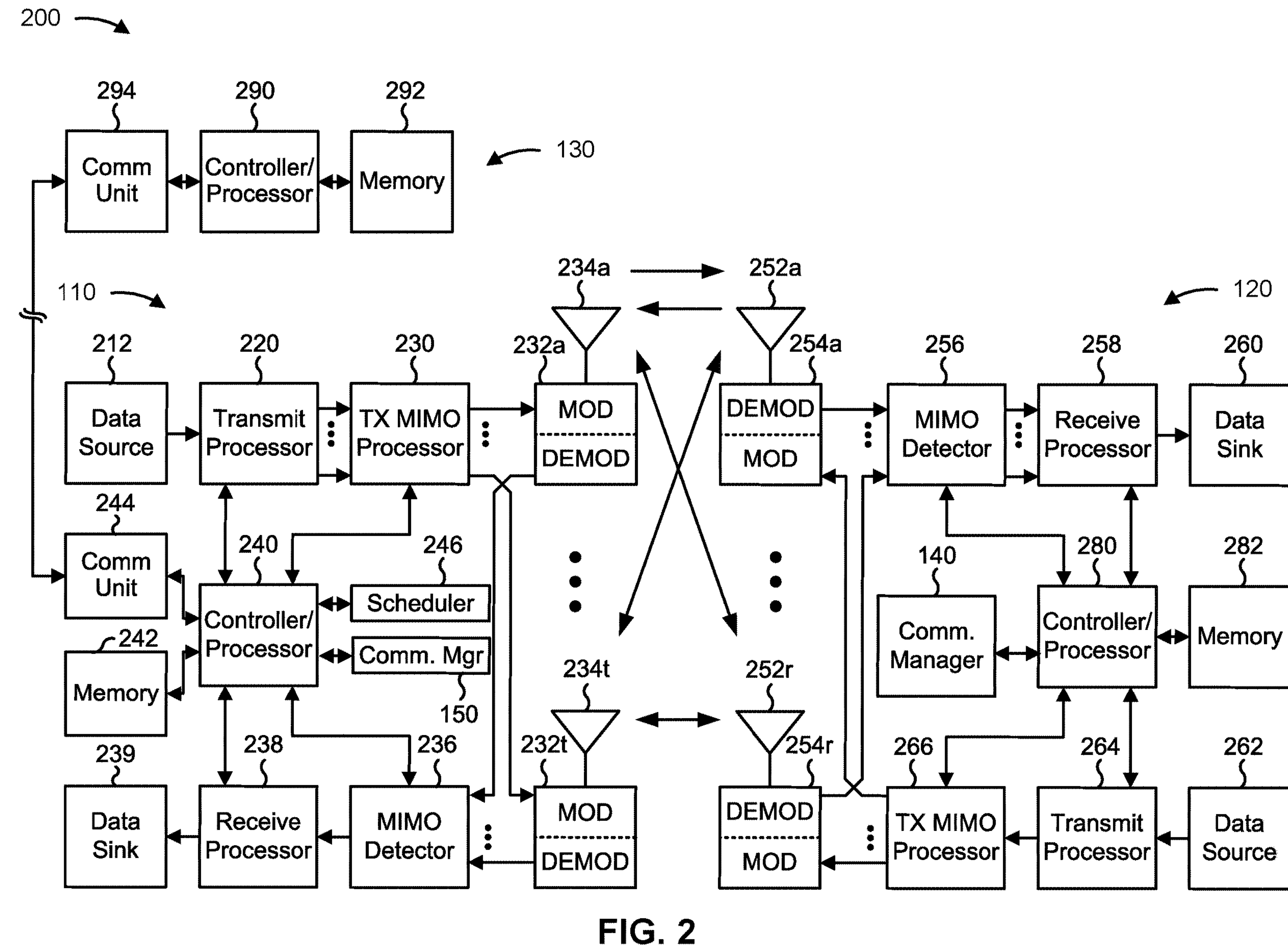
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with communication using a default common beam, as described in more detail elsewhere herein. In some aspects, a TRP described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving, from a base station, information relating to one or more transmissions to be transmitted or received by the UE; or means for communicating with the base station using a default common beam for the one or more transmissions. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for initiating an inactivity timer. In some aspects, the UE includes means for receiving a physical downlink control channel (PDCCH) communication that indicates a downlink assignment for an active bandwidth part, means for receiving a PDCCH communication that indicates an uplink grant for an active bandwidth part, means for transmitting a medium access control (MAC) protocol data unit (PDU) in a configured uplink grant, means for receiving a MAC PDU in a configured downlink assignment, means for determining that a random access procedure for a serving cell is complete, or means for determining that a random access procedure for a serving cell is complete upon receiving a PDCCH communication.

In some aspects, the UE includes means for initiating the inactivity timer based at least in part on the UE entering a power saving mode.

In some aspects, the base station includes means for transmitting, to a UE, information relating to one or more transmissions to be transmitted or received by the UE; or means for communicating with the UE using a default common beam for the one or more transmissions. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for initiating an inactivity timer. In some aspects, the base station includes means for receiving an uplink communication for an active bandwidth part.

In some aspects, the base station includes means for initiating the inactivity timer based at least in part on the UE entering a power saving mode.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3A:
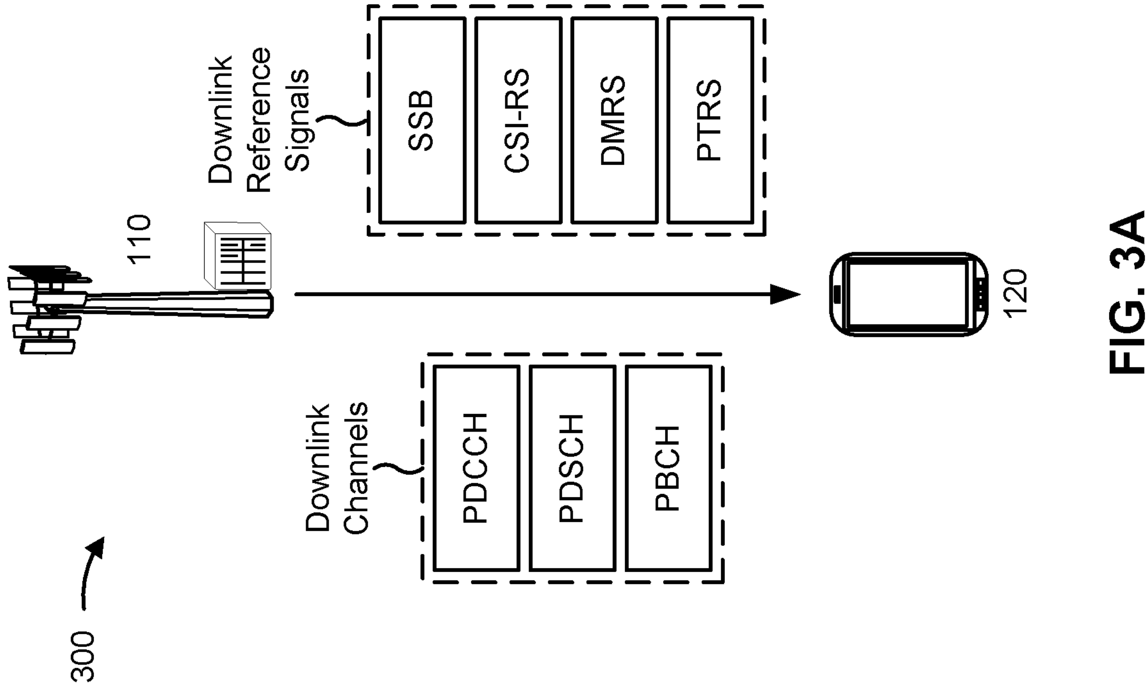
FIG. 3A is a diagram illustrating an example of physical channels and reference signals in a wireless network, in accordance with various aspects of the present disclosure.

FIG. 3A is a diagram illustrating an example 300 of physical channels and reference signals in a wireless network, in accordance with various aspects of the present disclosure. As shown in FIG. 3A, downlink channels and downlink reference signals may carry information from a base station 110 to a UE 120.

As shown, a downlink channel may include a PDCCH that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown, a downlink reference signal may include a synchronization signal block (SSB), a CSI-RS, a DMRS, a positioning reference signal (PRS), or a phase tracking reference signal (PTRS), among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MC S), or a refined downlink beam (e.g., using a beam refinement procedure or a beam management procedure), among other examples.

A DMRS may carry information used to estimate a radio channel for demodulation of an associated physical channel (e.g., PDCCH, PDSCH, or PBCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for downlink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). PTRSs are used for downlink communications (e.g., on the PDSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

As indicated above, FIG. 3A is provided as an example Other examples may differ from what is described with regard to FIG. 3A.

Figure 3B:
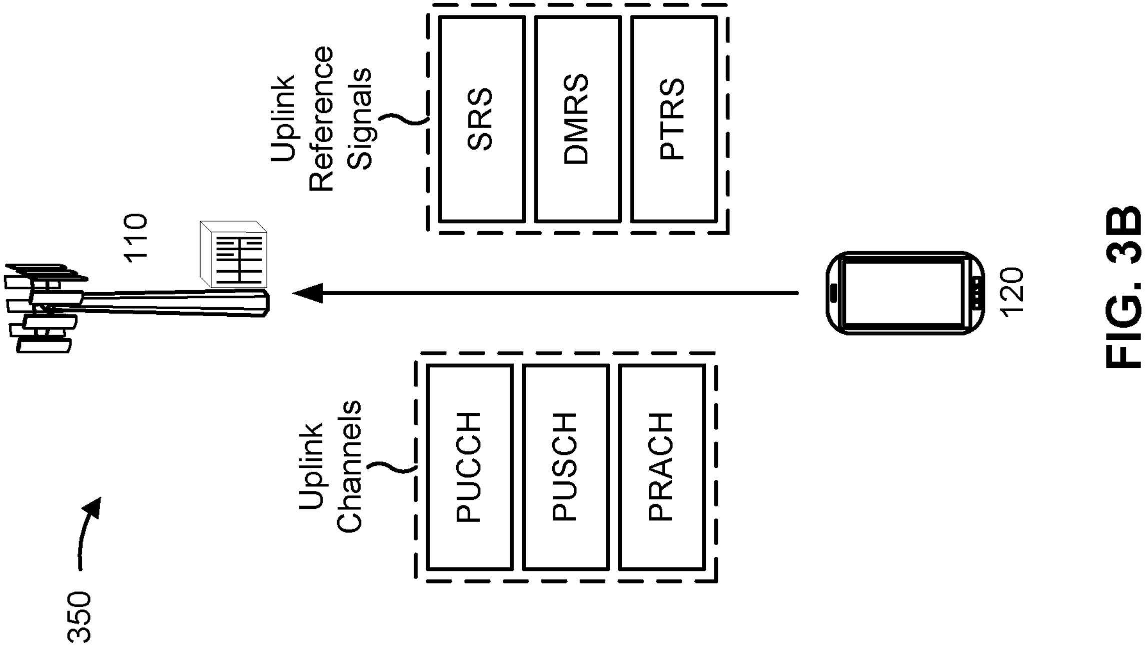
FIG. 3B is a diagram illustrating an example of physical channels and reference signals in a wireless network, in accordance with various aspects of the present disclosure.

FIG. 3B is a diagram illustrating an example 350 of physical channels and reference signals in a wireless network, in accordance with various aspects of the present disclosure. As shown in FIG. 3B, uplink channels and uplink reference signals may carry information from a UE 120 to a base station 110.

As shown, an uplink channel may include a physical uplink control channel (PUCCH) that carries uplink control information (UCI), a physical uplink shared channel (PUS CH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH. As further shown, an uplink reference signal may include a sounding reference signal (SRS), a DMRS, or a PTRS, among other examples.

A DMRS may carry information used to estimate a radio channel for demodulation of an associated physical channel (e.g., PUCCH or PUSCH), as described above. DMRSs are used for uplink communications. A PTRS may carry information used to compensate for oscillator phase noise, as described above. PTRSs are used for uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3B is provided as an example. Other examples may differ from what is described with regard to FIG. 3B.

Figure 4A:
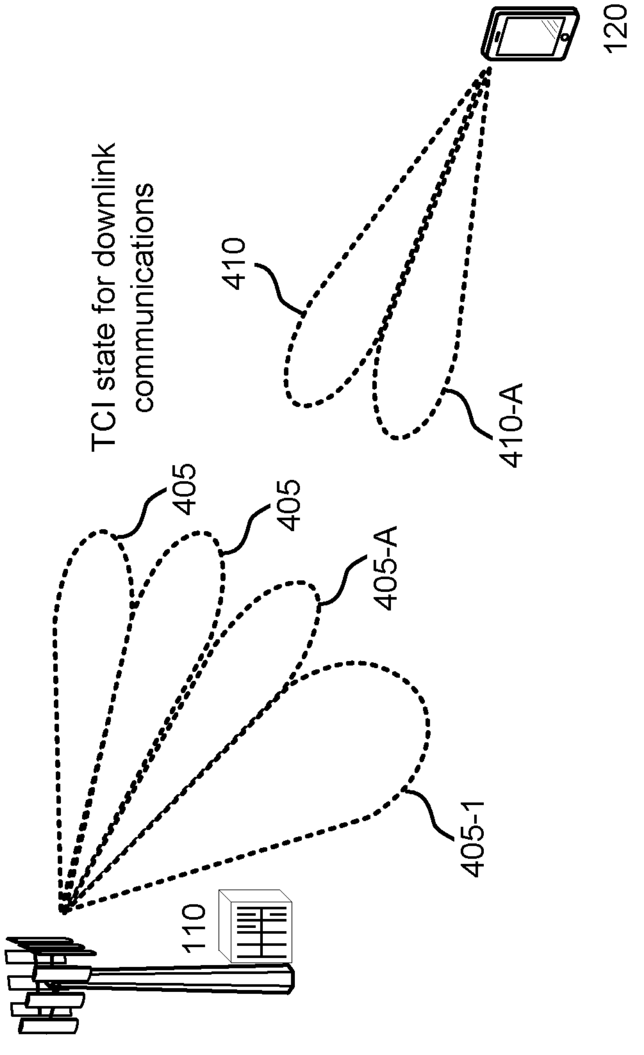
FIG. 4A is a diagram illustrating an example of using beams for communications between a base station and a UE, in accordance with various aspects of the present disclosure.

FIG. 4A is a diagram illustrating an example 400 of using beams for communications between a base station and a UE, in accordance with various aspects of the present disclosure. As shown in FIG. 4A, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405. In some examples, the base station 110 may transmit downlink communications via a wide beam 405-1. The base station 110 may use the wide beam 405-1 for transmission of downlink communications in multiple directions, and therefore the wide beam 405-1 is useful in examples involving movement of the UE 120. In some examples, the base station 110 may transmit downlink communications via a narrow beam 405 or 405-A. The base station 110 may use the narrow beam 405 or 405-A for transmission of downlink communications in a single direction. However, the narrow beam 405 or 405-A may enable higher throughput relative to the wide beam 405-1.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

As indicated above, FIG. 4A is provided as an example Other examples may differ from what is described with respect to FIG. 4A.

Figure 4B:
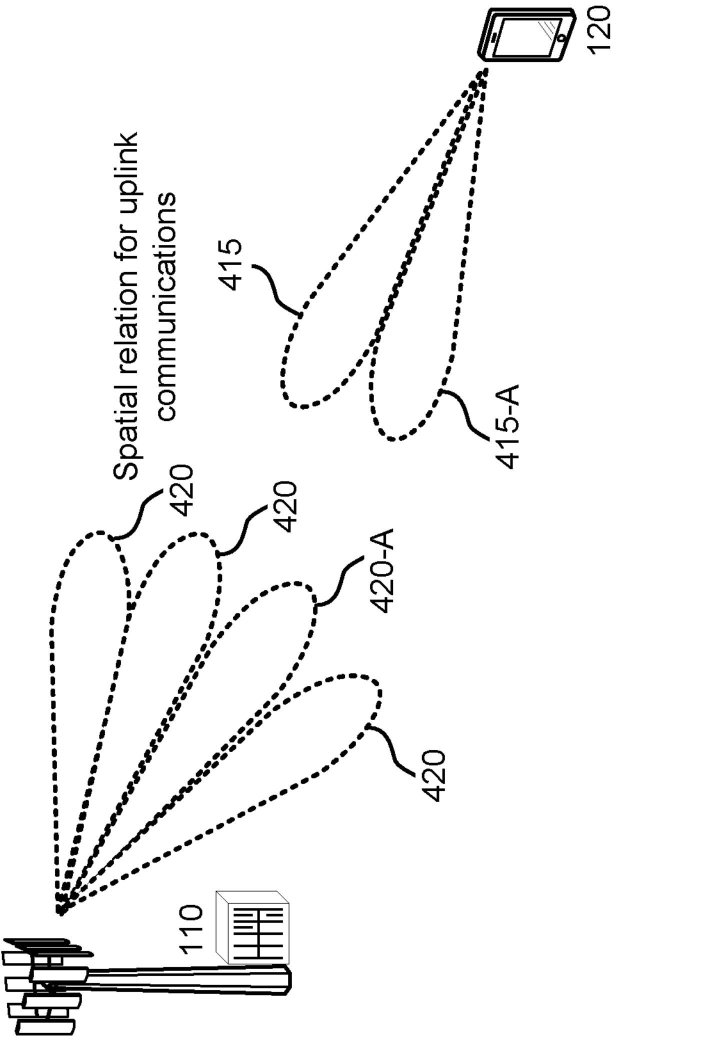
FIG. 4B is a diagram illustrating an example of using beams for communications between a base station and a UE, in accordance with various aspects of the present disclosure.

FIG. 4B is a diagram illustrating an example 450 of using beams for communications between a base station and a UE, in accordance with various aspects of the present disclosure. As shown in FIG. 4B, a base station 110 and a UE 120 may communicate with one another.

In a similar manner as described above, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4B is provided as an example. Other examples may differ from what is described with respect to FIG. 4B.

Figure 5:
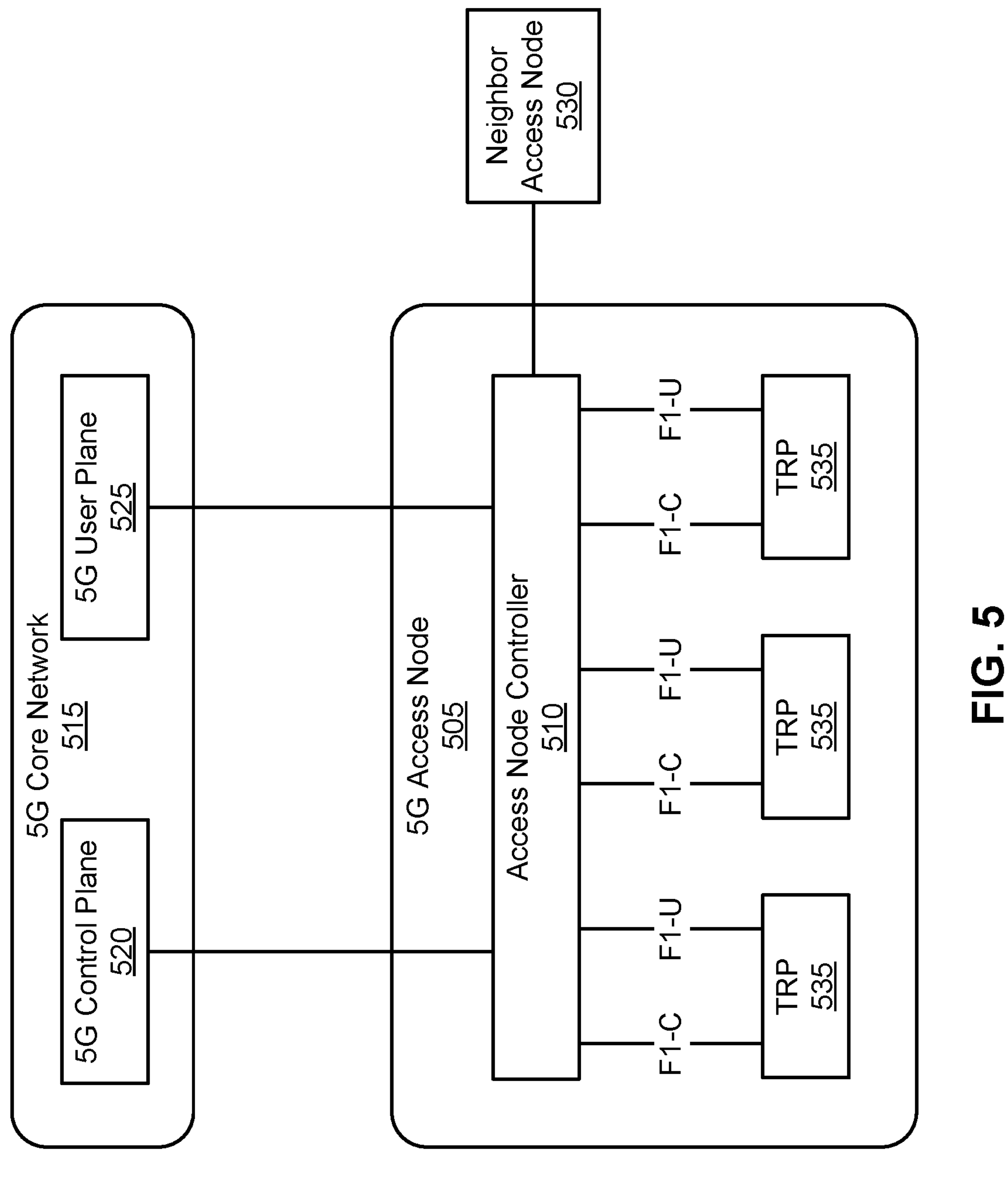
FIG. 5 is a diagram illustrating an example logical architecture of a distributed radio access network, in accordance with various aspects of the present disclosure.

FIG. 5 is a diagram illustrating an example logical architecture of a distributed radio access network (RAN) 500, in accordance with various aspects of the present disclosure.

A 5G access node 505 may include an access node controller 510. The access node controller 510 may be a central unit (CU) of the distributed RAN 500. In some aspects, a backhaul interface to a 5G core network 515 may terminate at the access node controller 510. The 5G core network 515 may include a 5G control plane component 520 and a 5G user plane component 525 (e.g., a 5G gateway), and the backhaul interface for one or both of the 5G control plane and the 5G user plane may terminate at the access node controller 510. Additionally, or alternatively, a backhaul interface to one or more neighbor access nodes 530 (e.g., another 5G access node 505, an LTE access node, and/or the like) may terminate at the access node controller 510.

The access node controller 510 may include and/or may communicate with one or more TRPs 535 (e.g., via an F1 Control (F1-C) interface and/or an F1 User (F1-U) interface). A TRP 535 may be a distributed unit (DU) of the distributed RAN 500. In some aspects, a TRP 535 may correspond to a base station 110 described above in connection with FIG. 1. For example, different TRPs 535 may be included in different base stations 110. Additionally, or alternatively, multiple TRPs 535 may be included in a single base station 110. In some aspects, a base station 110 may include a CU (e.g., access node controller 510) and/or one or more DUs (e.g., one or more TRPs 535). In some cases, a TRP 535 may be referred to as a cell, a panel, an antenna array, an array, and/or the like.

A TRP 535 may be connected to a single access node controller 510 or to multiple access node controllers 510. In some aspects, a dynamic configuration of split logical functions may be present within the architecture of distributed RAN 500. For example, a packet data convergence protocol (PDCP) layer, a radio link control (RLC) layer, a MAC layer, and/or the like may be configured to terminate at the access node controller 510 or at a TRP 535.

In some aspects, multiple TRPs 535 may transmit communications (e.g., the same communication or different communications) in the same transmission time interval (TTI) (e.g., a slot, a mini-slot, a subframe, a symbol, and/or the like) or different TTIs using different QCL relationships (e.g., different spatial parameters, different TCI states, different precoding parameters, different beamforming parameters, and/or the like). In some aspects, a TCI state may be used to indicate one or more QCL relationships. A TRP 535 may be configured to individually (e.g., using dynamic selection) or jointly (e.g., using joint transmission with one or more other TRPs 535) serve traffic to a UE 120.

As indicated above, FIG. 5 is provided as an example. Other examples may differ from what was described with regard to FIG. 5.

Figure 6:
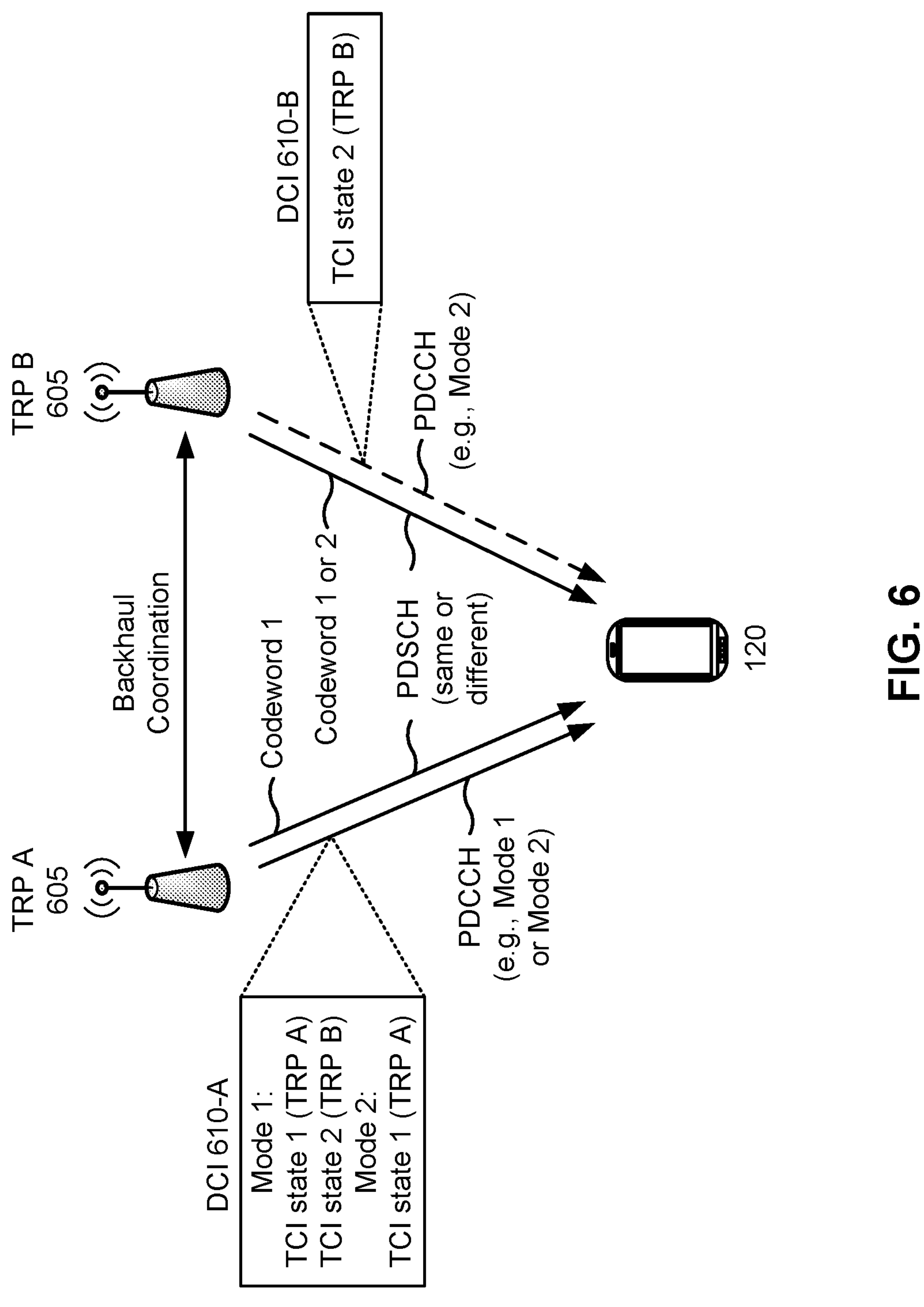
FIG. 6 is a diagram illustrating an example of multi-transmit receive point (TRP) communication, in accordance with various aspects of the present disclosure.

FIG. 6 is a diagram illustrating an example 600 of multi-TRP communication (sometimes referred to as multi-panel communication), in accordance with various aspects of the present disclosure. As shown in FIG. 6, multiple TRPs 605 may communicate with the same UE 120. A TRP 605 may correspond to a TRP 535 described above in connection with FIG. 5.

The multiple TRPs 605 (shown as TRP A and TRP B) may communicate with the same UE 120 in a coordinated manner (e.g., using coordinated multipoint transmissions and/or the like) to improve reliability, increase throughput, and/or the like. The TRPs 605 may coordinate such communications via an interface between the TRPs 605 (e.g., a backhaul interface, an access node controller 510, and/or the like). The interface may have a smaller delay and/or higher capacity when the TRPs 605 are co-located at the same base station 110 (e.g., when the TRPs 605 are different antenna arrays or panels of the same base station 110), and may have a larger delay and/or lower capacity (as compared to co-location) when the TRPs 605 are located at different base stations 110. The different TRPs 605 may communicate with the UE 120 using different QCL relationships (e.g., different TCI states), different DMRS ports, different layers (e.g., of a multi-layer communication), and/or the like.

In a first multi-TRP transmission mode (e.g., Mode 1), a single PDCCH, carrying a single DCI 610-A, may be used to schedule downlink data communications for a single PDSCH. In this case, multiple TRPs 605 (e.g., TRP A and TRP B) may transmit communications to the UE 120 on the same PDSCH. For example, a communication may be transmitted using a single codeword (shown as Codeword 1) with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords (shown as Codeword 1 and Codeword 2), where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state (shown as TCI state 1) for a first set of DMRS ports corresponding to a first set of layers, and a second TRP 605 may use a second (different) QCL relationship or a second (different) TCI state (shown as TCI state 2) for a second (different) set of DMRS ports corresponding to a second (different) set of layers. In some aspects, a TCI state in DCI 610-A (e.g., transmitted on the PDCCH, such as DCI format 1_0, DCI format 1_1, and/or the like) may indicate the first QCL relationship (e.g., by indicating a first TCI state (TCI state 1)) and the second QCL relationship (e.g., by indicating a second TCI state (TCI state 2)). The first and the second TCI states may be indicated using a TCI field in the DCI 610-A. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH, carrying a first DCI 610-A, may schedule a first codeword (Codeword 1) to be transmitted by a first TRP 605, and a second PDCCH, carrying a second DCI 610-B, may schedule a second codeword (Codeword 2) to be transmitted by a second TRP 605. Furthermore, the first DCI 610-A (e.g., transmitted by the first TRP 605) may schedule a first PDSCH communication associated with a first set of DMRS ports with a first QCL relationship (e.g., indicated by a first TCI state (TCI state 1)) for the first TRP 605, and the second DCI 610-B (e.g., transmitted by the second TRP 605) may schedule a second PDSCH communication associated with a second set of DMRS ports with a second QCL relationship (e.g., indicated by a second TCI state (TCI state 2)) for the second TRP 605. In this case, DCI (e.g., having DCI format 1_0, DCI format 1_1, and/or the like) may indicate a corresponding TCI state for a TRP 605 corresponding to the DCI. The TCI field of a DCI indicates the corresponding TCI state (e.g., the TCI field of the first DCI 610-A indicates the first TCI state (TCI state 1) and the TCI field of the second DCI 610-B indicates the second TCI state (TCI state 2)).

As indicated above, FIG. 6 is provided as an example. Other examples may differ from what is described with respect to FIG. 6.

A UE and a base station may communicate using common beams. A common beam may be indicated or updated in DCI using a common beam TCI state. Accordingly, common beam TCI states may be defined and used for indication of a common beam to a UE. For example, a first joint DL and UL common beam TCI state may be used to indicate a common beam for at least one DL channel and/or DL reference signal and at least one UL channel and/or UL reference signal. A second separate DL common beam TCI state may be used to indicate a common beam for at least two DL channels and/or DL reference signals. A third separate UL common beam TCI state may be used to indicate a common beam for at least two UL channels and/or UL reference signals.

A joint DL/UL beam indication or a separate DL/UL beam indication may be provided in signaling from the base station. For example, the base station may use Layer 1 (L1)-based (e.g., DCI-based) beam indication using at least UE-specific (e.g., unicast) DCI to indicate a joint DL/UL beam and/or a separate DL/UL beam from active TCI states. An application time for a beam indicated in DCI may be counted from the end of the DCI or from the end of a communication of ACK feedback for the DCI. For example, if a UE receives a beam indication in DCI, the UE may down-select from the first slot that is at least X milliseconds (ms) or Y symbols after the DCI with the joint DL/UL beam indication or separate DL/UL beam indication, or the first slot that is at least X ms or Y symbols after the ACK feedback of joint DL/UL beam indication or separate DL/UL beam indication (where X and Y may be defined values).

A narrow common beam may be beneficial for throughput and coverage. Moreover, a receive beam can be refined by exploiting traffic transmissions. For example, during periods of traffic activity between the UE and the base station, the UE may identify an optimal antenna panel, or receive beam, for a common beam TCI state by measuring a DMRS simultaneously via multiple panels/receive beams. In the absence of such traffic, the UE may use a periodic CSI-RS for a TCI state for receive beam refinement. Tracking performance of the CSI-RS may be correlated with the CSI-RS period, which may be relatively long. Moreover, the UE may transmit ACK feedback for DCI that provides an update to a common beam TCI state. However, the PUCCH communication carrying the ACK feedback may not be detected by the base station, and the base station may retransmit the DCI using the original transmit beam. Whereas, the UE may have switched to using a receive beam associated with the updated common beam TCI state in accordance with the DCI. As a result, the retransmitted DCI may not reach the UE due to misaligned beam pairs at the UE and the base station (e.g., when the UE supports only a single active beam and no CORESET associated with a different beam can be used).

In some aspects, the UE and the base station may communicate using default common beams, such as when an indicated common beam is unsuitable, as described above. In some aspects, the UE and/or the base station may switch (e.g., fallback) from using an indicated common beam to using a default common beam based at least in part on an expiration of an inactivity timer. For example, the UE and the base station may initiate respective inactivity timers (e.g., at the start of a period of no traffic between the base station and the UE), and the UE and the base station may switch to a default common beam upon expiration of the inactivity timers (e.g., if there was no traffic between the base station and the UE before the expiration). In one or more examples, a default common beam may be a wide beam (e.g., a multidirectional beam or an omnidirectional beam), whereas the indicated common beam may be a narrow beam (e.g., a single directional beam). Thus, the default common beam is therefore more robust to UE movement than the indicated common beam. Accordingly, in one or more examples, a default common beam may enable communication between the UE and the base station in the absence of beam refinement aided by traffic between the UE and the base station. In addition, a default common beam may provide an aligned beam pair at the UE and base station, thereby resolving a misaligned beam pair link In particular, a default common beam may be beneficial if there is no traffic activity between the UE and the base station for a particular duration (e.g., a relatively long duration). For example, the UE and the base station may communicate using default common beams if there is a period in which there is no traffic activity between the UE and the base station, as described above. In some aspects, a default common beam may be associated with a particular common beam TCI state or may be associated with a particular reference signal.

As described above, a default common beam may be relatively wider than a common beam indicated in DCI and is therefore more robust to UE movement. Accordingly, a default common beam may enable communication between the UE and the base station in the absence of beam refinement aided by traffic between the UE and the base station. Moreover, a default common beam pair link, with relatively wide common beams at the UE and the base station, may improve the reliability of communications between the UE and the base station (e.g., relative to a tracked narrow common beam pair). In addition, a default common beam may provide an aligned beam pair at the UE and base station, thereby resolving a misaligned beam pair link and permitting traffic between the UE and the base station to resume.

Figure 7:
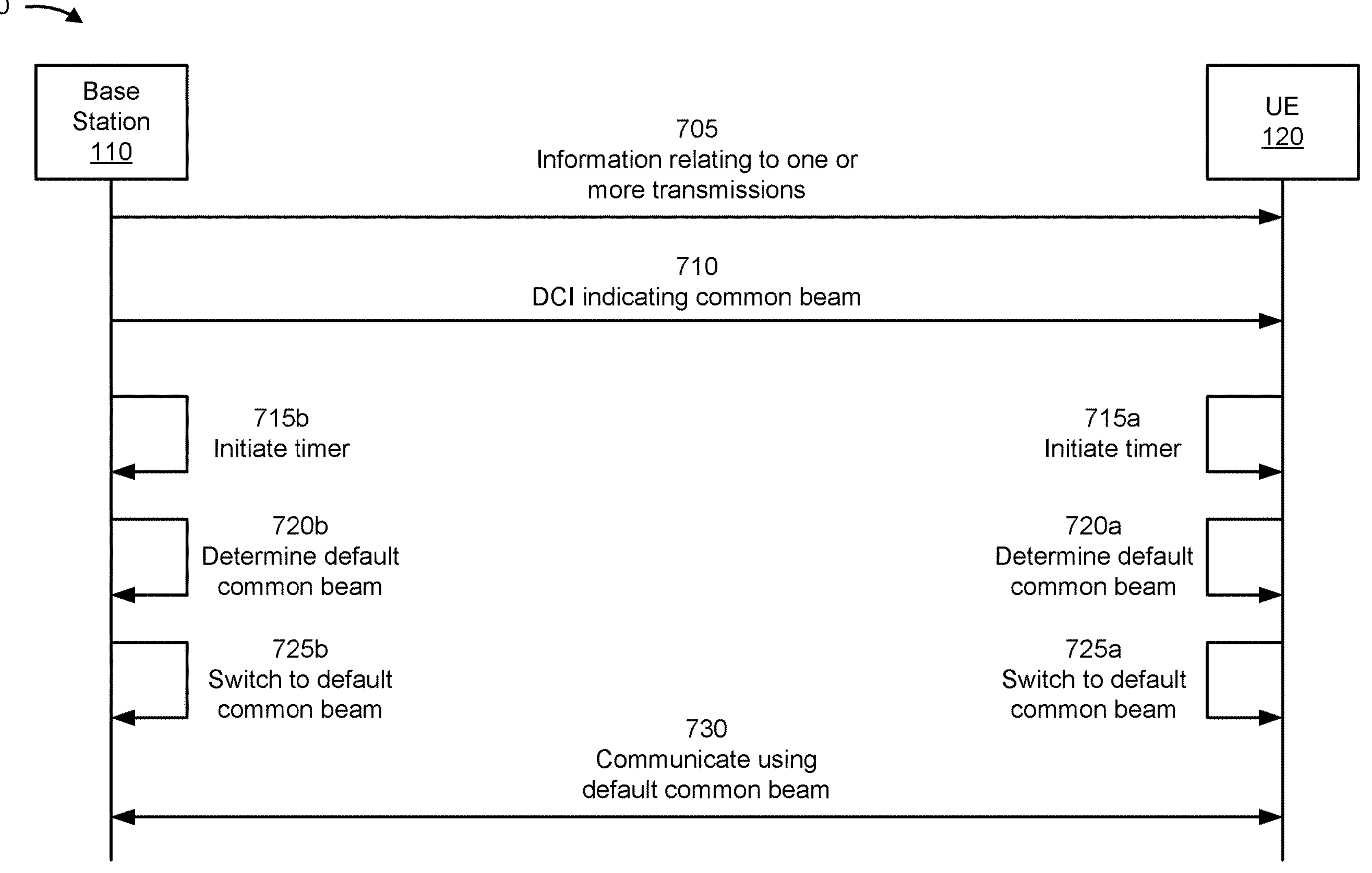
FIG. 7 is a diagram illustrating an example associated with communication using a default common beam, in accordance with various aspects of the present disclosure.

FIG. 7 is a diagram illustrating an example 700 associated with communication using a default common beam, in accordance with various aspects of the present disclosure. As shown in FIG. 7, a base station 110 and a UE 120 may communicate with one another. In some aspects, the UE 120 may communicate with a single TRP, and the base station 110 may correspond to or include the single TRP. In some aspects, the UE 120 may communicate with multiple TRPs, and the base station 110 may correspond to or include one of the multiple TRPs. In some aspects, the base station 110 may include the multiple TRPs.

As shown by reference number 705, the base station 110 may transmit, and the UE 120 may receive, information relating to one or more transmissions that are to be transmitted or received by the UE 120. In some aspects, the information may be in DCI, a medium access control control element (MAC-CE), a configuration (e.g., an RRC configuration), and/or system information (e.g., a master information block (MIB) or a system information block (SIB)). For example, DCI may schedule the one or more transmissions, a configuration may configure the one or more transmissions and/or identify a resource for the one or more transmissions, and/or system information may identify a resource for the one or more transmissions. In some aspects, a single DCI may schedule the UE 120 to transmit and/or receive the one or more transmissions with multiple TRPs. In some aspects, multiple DCI (e.g., respective DCI) may schedule the UE 120 to transmit and/or receive the one or more transmissions with multiple TRPs.

As shown by reference number 710, the base station 110 may transmit, and the UE 120 may receive, DCI that indicates a common beam. For example, the DCI may identify a common beam TCI state (e.g., one or more of the first, second, or third common beam TCI states described above). The base station 110 and the UE 120 may communicate using a common beam in accordance with the DCI. In some aspects, the common beam may be relatively narrow (e.g., relative to a default common beam).

As shown by reference number **715*a*, the UE 120 may initiate a timer. The timer may be an inactivity timer. The UE 120 may be configured (e.g., via RRC) with a particular amount of time that is to be used as an expiration time for the inactivity timer. Additionally, or alternatively, the UE 120 may be provisioned with the particular amount of time that is to be used as the expiration time (e.g., the particular amount of time may be fixed at the UE 120). For example, the particular amount of time may be 10 ms. The inactivity timer may be associated with an active bandwidth part (e.g., an active DL bandwidth part or an active UL bandwidth part) of a component carrier (e.g., a bandwidth part activated for the UE 120** in the component carrier).

The UE 120 may initiate (e.g., start or re-start) the inactivity timer based at least in part on determining that at least a subset of conditions, of a set of conditions, are true. A condition, of the set of conditions, may be that a PDCCH communication (e.g., addressed to a cell radio network temporary identifier (C-RNTI) or a configured scheduling RNTI (CS-RNTI)) indicating a downlink assignment is received for (e.g., received on) the active bandwidth part. A condition, of the set of conditions, may be that a PDCCH communication (e.g., addressed to a C-RNTI or a CS-RNTI) indicating an uplink grant is received for (e.g., received on) the active bandwidth part. A condition, of the set of conditions, may be that a MAC PDU (e.g., a transport block) is transmitted by the UE 120 in a configured uplink grant. A condition, of the set of conditions, may be that a MAC PDU is received by the UE 120 in a configured downlink assignment. A condition, of the set of conditions, may be that a random access procedure for a serving cell of the UE 120 is not ongoing (e.g., this condition may be used in combination with one or more of the conditions described above). A condition, of the set of conditions, may be that a random access procedure for a serving cell of the UE 120 is complete (e.g., is successfully completed) upon receiving a PDCCH communication (e.g., addressed to a C-RNTI), such as a PDCCH communication described above.

The inactivity timer may expire if there is no traffic activity between the UE 120 and the base station 110 after initiation of the inactivity timer. For example, the inactivity timer may expire if there is no data that is to be communicated between the UE 120 and the base station 110. As another example, the inactivity timer may expire if there is a misaligned beam pair link between the UE 120 and the base station 110.

At an expiration of the inactivity timer, the UE 120 may switch to using a default common beam for communicating with the base station 110. The default common beam may be different from the indicated common beam in the DCI, as described above. For example, the default common beam may be relatively wide (e.g., relative to the indicated common beam). In some aspects, an application time for an updated beam (e.g., a common beam indicated in DCI and/or a default common beam) may be based at least in part on an expiration of the inactivity timer. For example, the application time may be a particular quantity of symbols or number of milliseconds after an expiration of the inactivity timer.

In some aspects, the UE 120 may initiate the inactivity timer based at least in part on entering a power saving mode (e.g., a low-power mode, an idle mode, a sleep mode, and/or a discontinuous reception (DRX) mode, among other examples). When the UE 120 (e.g., a transceiver of the UE 120) is in a power-saving mode, one or more modules and/or components (e.g., a radio frequency transceiver, a transceiver front end, a baseband processor, and/or a digital signal processor, among other examples) of the transceiver may be disabled and/or deactivated such that the modules and/or components consume fewer processing, memory, radio, and/or battery resources. In some aspects, the power saving mode may be a secondary cell (SCell) dormancy mode and/or a power saving mode used outside of an active time of the UE 120 (e.g., outside of a DRX on-period). Here, at an expiration of the inactivity timer, the UE 120 may switch to using a default common beam upon waking (e.g., upon leaving the power saving mode). Moreover, the UE 120 may stop the inactivity timer if the UE 120 leaves the power saving mode while the inactivity timer is running.

In some aspects, upon an expiration of the inactivity timer, the UE 120 may remain on a currently-active DL bandwidth part (e.g., a DL bandwidth part that is active at an expiration of the inactivity timer), and the UE 120 and the base station 110 may communicate on the currently-active DL bandwidth part. In some aspects, upon an expiration of the inactivity timer, the UE 120 may switch to a default DL bandwidth part as the active DL bandwidth part, and the UE 120 and the base station 110 may communicate on the default DL bandwidth part. In some aspects, the base station 110 may transmit (e.g., via RRC signaling, a MAC-CE, and/or DCI) an indication of the default DL bandwidth part. In some aspects, the UE 120 and/or the base station 110 may determine the default DL bandwidth part according to a rule (e.g., the DL bandwidth part may be implicitly determined). For example, the default DL bandwidth part may be associated with a highest identifier or a lowest identifier (e.g., among bandwidth parts configured for the UE 120). As another example, the default DL bandwidth part may be an initial DL bandwidth part activated for the UE 120.

As shown by reference number 715*b*, the base station may initiate a timer in a similar manner as described above. For example, the timer may be an inactivity timer, which may be associated with an active bandwidth part for the UE 120.

The base station 110 may initiate (e.g., start or re-start) the inactivity timer based at least in part on determining that at least a subset, of a set of conditions, are true. A condition, of the set of conditions, may be that an uplink transmission is received for (e.g., received on) the active bandwidth part (e.g., the active UL bandwidth part). The uplink transmission may include an uplink transmission scheduled by DCI, such as a PUCCH transmission, a PUSCH transmission, an SRS transmission, and/or a PRACH transmission. Additionally, or alternatively, the uplink transmission may include an uplink transmission that is semi-statically configured, such as a periodic or semi-periodic PUSCH transmission, PUCCH transmission, and/or SRS transmission.

At an expiration of the inactivity timer, the base station 110 may switch to using a default common beam for communicating with the UE 120, in a similar manner as described above. In some aspects, the base station 110 may initiate the inactivity timer based at least in part on the UE 120 entering a power saving mode, and the base station 110 may switch to using a default common beam after an expiration of the inactivity timer and upon the UE 120 leaving the power saving mode, in a similar manner as described above.

As shown by reference numbers 720*a* and 720*b*, the UE 120 and/or the base station 110 may determine a default common beam that is to be used. For example, the UE 120 may determine a default common beam that is to be used by the UE 120, and the base station 110 may determine a default common beam that is to be used by the base station 110. The default common beam to be used by the UE 120 and the default common beam to be used by the base station 110 may include a beam pair for DL and/or UL communication. A default common beam may be indicated by the first, second, and/or third common beam TCI states described above. For example, a default common beam may be a common beam for at least one DL channel and/or DL reference signal and at least one UL channel and/or UL reference signal, a common beam for at least two DL channels and/or DL reference signals, and/or a common beam for at least two UL channels and/or UL reference signals.

In some aspects, the UE 120 and/or the base station 110 may determine a default common beam based at least in part on the UE 120 being in communication with a single TRP (e.g., the base station 110). Here, a default common beam may be associated with (or determined based at least in part on) a particular common beam TCI state identifier in the active bandwidth part of the component carrier. For example, the default common beam may be associated with a common beam TCI state mapped to a lowest TCI state identifier or TCI codepoint index, or a highest TCI state identifier or TCI codepoint index, for the active bandwidth part of the component carrier. Additionally, or alternatively, the default common beam may be associated with (or determined based at least in part on) a particular reference signal in the active bandwidth part of the component carrier (e.g., the default common beam is a common beam used for the reference signal). For example, the particular reference signal may be for indicating a QCL assumption for a particular CORESET, such as a CORESET with a highest identifier or a lowest identifier in the active bandwidth part of the component carrier.

In some aspects, the UE 120 and/or the base station 110 may determine a default common beam based at least in part on the UE 120 being in communication with multiple TRPs (e.g., the base station 110 and another base station, or multiple panels of the base station 110). Here, a default common beam for a TRP may be associated with (or determined based at least in part on) a particular common beam TCI state identifier associated with the TRP in the active bandwidth part of the component carrier. For example, respective default common beams for a first TRP and a second TRP may be associated with first and second common beam TCI states mapped to a highest TCI codepoint index, or a lowest TCI codepoint index, among TCI codepoint indices mapped to two common beam TCI states. Additionally, or alternatively, a default common beam for a TRP may be associated with (or determined based at least in part on) a particular reference signal associated with the TRP in the active bandwidth part of the component carrier. For example, for a first TRP, the particular reference signal may be for indicating a QCL assumption for a particular CORESET associated with a first CORESET pool index (e.g., CORESETPoolIndex of 0), such as a CORESET with a highest identifier or a lowest identifier for the first CORESET pool index. Continuing with the example, for a second TRP, the particular reference signal may be for indicating a QCL assumption for a particular CORESET associated with a second CORESET pool index (e.g., CORESETPoolIndex of 1), such as a CORESET with a highest identifier or a lowest identifier for the second CORESET pool index.

As shown by reference number 725*a*, the UE 120 may switch to a default common beam for communication with the base station 110. The UE 120 may switch to the default common beam upon expiration of the inactivity timer initiated by the UE 120, as described above. The UE 120 may switch to the default common beam that was determined by the UE 120, as described above. As shown by reference number 725*b*, the base station 110 may switch to a default common beam for communication with the UE 120. The base station 110 may switch to the default common beam upon expiration of the inactivity timer initiated by the base station 110, as described above. The base station 110 may switch to the default common beam that was determined by the base station 110, as described above.

As shown by reference number 730, the base station 110 and the UE 120 may communicate using default common beams (e.g., a default common beam pair). For example, the UE 120 may communicate (e.g., transmit or receive) with the base station 110 using a default common beam for the one or more transmissions. As another example, the base station 110 may communicate (e.g., transmit or receive) with the UE 120 using a default common beam for the one or more transmissions. In other words, the UE 120 and/or the base station 110 may apply a default common beam to an intended set of channels and/or reference signals.

In some aspects, the one or more transmissions (e.g., the channels and/or reference signals applicable for a common beam TCI state) may include a UE-specific (e.g., unicast) and/or a non-UE-specific (e.g., multicast or broadcast) PDCCH transmission, PDSCH transmission, PUCCH transmission, and/or PUSCH transmission. In some aspects, a PDSCH transmission, a PUCCH transmission, and/or a PUSCH transmission may be dynamically scheduled by DCI, semi-statically activated by DCI and/or a MAC-CE, and/or semi-statically configured by RRC signaling. In some aspects, a PDSCH transmission may be associated with a scheduling offset between the scheduling DCI and the PDSCH transmission that is less than, equal to, or greater than a beam switching latency threshold value. In some aspects, a PDCCH transmission may be carried by all CORESETs configured for the UE 120, or a subset of CORESETs configured for the UE 120.

In some aspects, the one or more transmissions (e.g., the channels and/or reference signals applicable for a common beam TCI state) may include an SSB transmission, a periodic, a semi-periodic, and/or an aperiodic CSI-RS transmission, and/or a periodic, a semi-periodic, and/or an aperiodic PRS transmission. In some aspects, a CSI-RS may be for use in CSI measurement and/or reporting (e.g., without a higher-layer tracking reference signal (TRS) information (trs-Info) parameter and/or a higher-layer repetition parameter configured for the UE 120). In some aspects, a CSI-RS may be for use in beam measurement and/or reporting (e.g., with a higher-layer repetition parameter configured for the UE 120). In some aspects, a CSI-RS may be for use in TRS measurement (e.g., with a higher-layer trs-Info parameter configured for the UE 120).

In some aspects, the one or more transmissions (e.g., the channels and/or reference signals applicable for a common beam TCI state) may include a periodic, a semi-periodic, and/or an aperiodic SRS transmission. In some aspects, an SRS may be for use in antenna switching, beam management, codebook-based PUSCH transmission, and/or non-codebook-based PUSCH transmission. In some aspects, a PUCCH, an SSB, a CSI-RS, a PRS, and/or an SRS may be for transmission on all corresponding configured resources or a subset of corresponding configured resources.

In some aspects, the UE 120 may use a particular beam failure detection (BFD) reference signal (e.g., an implicit BFD reference signal, rather than an indicated BFD reference signal) when using a default common beam. In some aspects, the BFD reference signal is a QCL reference signal (e.g., a QCL source) associated with an indicated beam (e.g., an original beam indicated for the UE 120, such as an indicated common beam). In some aspects, the BFD reference signal is a QCL reference signal associated with the default common beam. In some aspects, the BFD reference signal is the QCL reference signal associated with the indicated beam and the QCL reference signal associated with the default common beam. In some aspects, the BFD reference signal is a QCL reference signal associated with a particular CORESET (e.g., a special CORESET) in the active bandwidth part. For example, the CORESET may be associated with a highest identifier or a lowest identifier (e.g., among CORESETs configured in the active bandwidth part). The CORESET may not be associated with a search space (e.g., the CORESET may be a dummy CORESET).

In some aspects, the UE 120 may cease one or more BFD operations when using a default common beam. For example, the UE 120 may cease at least implicit BFD operations (e.g., BFD using an implicit BFD reference signal). In some aspects, the UE 120 may cease performing BFD when using a default common beam.

As indicated above, FIG. 7 is provided as an example. Other examples may differ from what is described with respect to FIG. 7.

Figure 8:
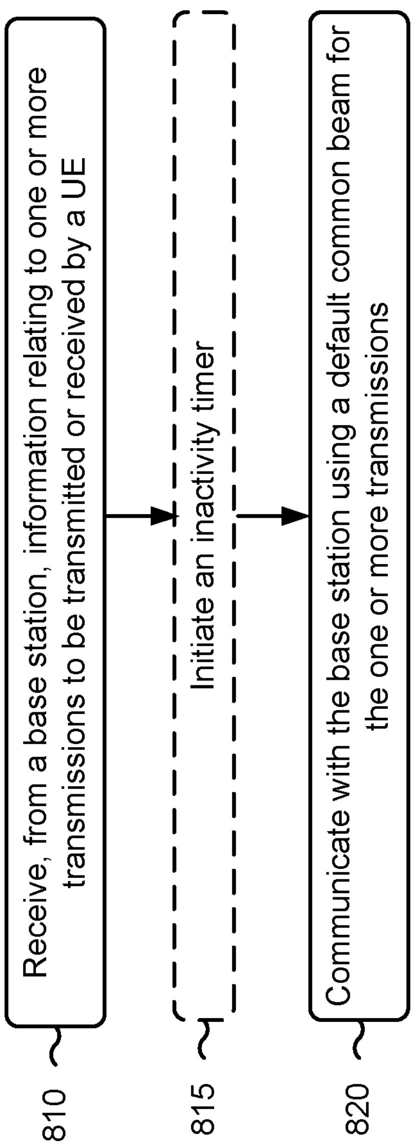
FIG. 8 is a diagram illustrating an example process associated with communication using a default common beam performed by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with communication using a default common beam.

As shown in FIG. 8, in some aspects, process 800 may include receiving, from a base station, information relating to one or more transmissions to be transmitted or received by the UE (block 810). For example, the UE (e.g., using reception component 1002, depicted in FIG. 10) may receive, from a base station, information relating to one or more transmissions to be transmitted or received by the UE, as described above.

In some aspects, process 800 may include initiating an inactivity timer (block 815). For example, the UE (e.g., using timer component 1008, depicted in FIG. 10) may initiate an inactivity timer, as described above.

As further shown in FIG. 8, in some aspects, process 800 may include communicating with the base station using a default common beam for the one or more transmissions (block 820). For example, the UE (e.g., using reception component 1002 and/or transmission component 1004, depicted in FIG. 10) may communicate with the base station using a default common beam for the one or more transmissions, as described above.

Process 800 may include additional aspects, such as any single aspect or any combination of aspects described below and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
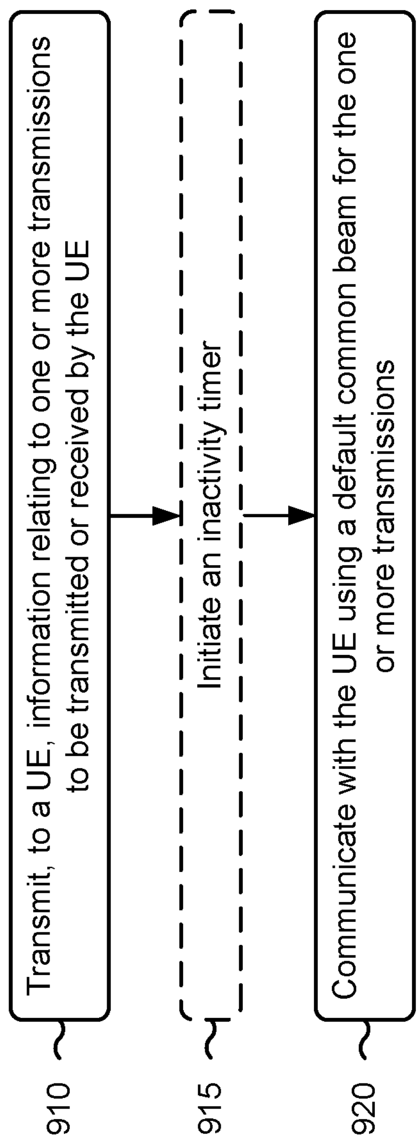
FIG. 9 is a diagram illustrating an example process associated with communication using a default common beam performed by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110) performs operations associated with communication using a default common beam.

As shown in FIG. 9, in some aspects, process 900 may include transmitting, to a UE, information relating to one or more transmissions to be transmitted or received by the UE (block 910). For example, the base station (e.g., using transmission component 1304, depicted in FIG. 13) may transmit, to a UE, information relating to one or more transmissions to be transmitted or received by the UE, as described above.

In some aspects, process 900 may include initiating an inactivity timer (block 915). For example, the base station (e.g., using timer component 1308, depicted in FIG. 13) may initiate an inactivity timer, as described above.

As further shown in FIG. 9, in some aspects, process 900 may include communicating with the UE using a default common beam for the one or more transmissions (block 920). For example, the base station (e.g., using reception component 1302 and/or transmission component 1304, depicted in FIG. 13) may communicate with the UE using a default common beam for the one or more transmissions, as described above.

Process 900 may include additional aspects, such as any single aspect or any combination of aspects described below and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
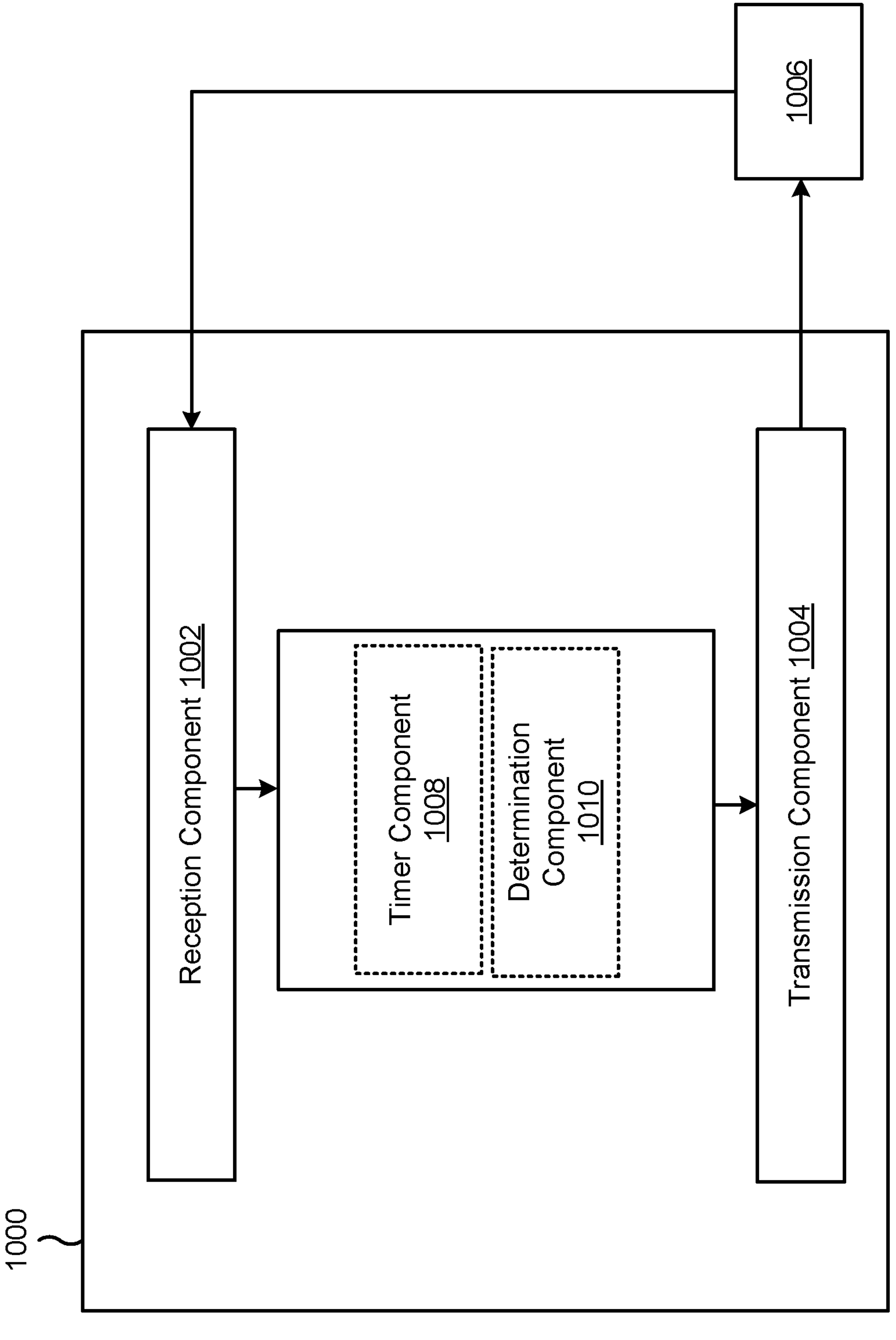
FIG. 10 is a block diagram of an example apparatus for wireless communication, in accordance with various aspects of the present disclosure.

FIG. 10 is a block diagram of an example apparatus 1000 for wireless communication, in accordance with various aspects of the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a timer component 1008 or a determination component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2.

Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a base station, information relating to one or more transmissions to be transmitted or received by the UE. The reception component 1002 and/or the transmission component 1004 may communicate with the base station using a default common beam for the one or more transmissions (e.g., based at least in part on a determination, such as by determination component 1010, of an expiration of an inactivity timer).

The timer component 1008 may initiate an inactivity timer. In some aspects, the timer component 1008 may initiate the inactivity timer based at least in part on one or more of receiving (e.g., by the reception component 1002) a PDCCH communication that indicates a downlink assignment for an active bandwidth part, receiving (e.g., by the reception component 1002) a PDCCH communication that indicates an uplink grant for an active bandwidth part, transmitting (e.g., by the transmission component 1004) a MAC PDU in a configured uplink grant, receiving (e.g., by the reception component 1002) a MAC PDU in a configured downlink assignment, determining (e.g., by the determination component 1010) that a random access procedure for a serving cell is complete, or determining (e.g., by the determination component 1010) that a random access procedure for a serving cell is complete upon receiving a PDCCH communication. In some aspects, the timer component 1008 may initiate the inactivity timer based at least in part on the UE entering a power saving mode.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
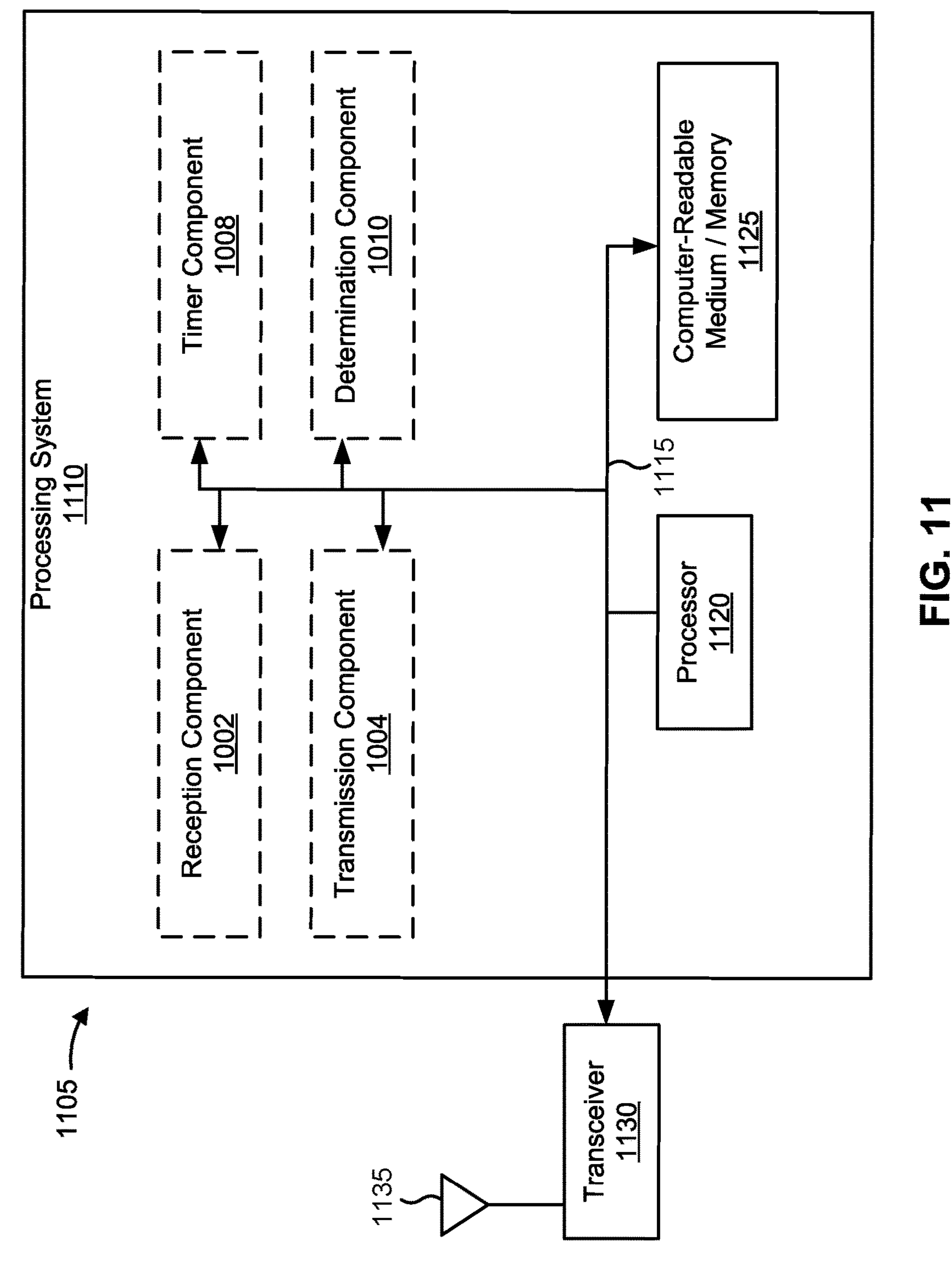
FIG. 11 is a diagram illustrating an example of a hardware implementation for an apparatus employing a processing system, in accordance with various aspects of the present disclosure.

FIG. 11 is a diagram illustrating an example 1100 of a hardware implementation for an apparatus 1105 employing a processing system 1110, in accordance with various aspects of the present disclosure. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the receive processor 258, and/or the controller/processor 280. In some aspects, the apparatus 1105 for wireless communication includes means for receiving, from a base station, information relating to one or more transmissions to be transmitted or received by the UE, means for communicating with the base station using a default common beam for the one or more transmissions, means for initiating an inactivity timer, means for receiving a PDCCH communication that indicates a downlink assignment for an active bandwidth part, means for receiving a PDCCH communication that indicates an uplink grant for an active bandwidth part, means for transmitting a MAC PDU in a configured uplink grant, means for receiving a MAC PDU in a configured downlink assignment, means for determining that a random access procedure for a serving cell is complete, means for determining that a random access procedure for a serving cell is complete upon receiving a PDCCH communication, and/or means for initiating the inactivity timer based at least in part on the UE entering a power saving mode. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 11 is provided as an example. Other examples may differ from what is described in connection with FIG. 11.

Figure 12:
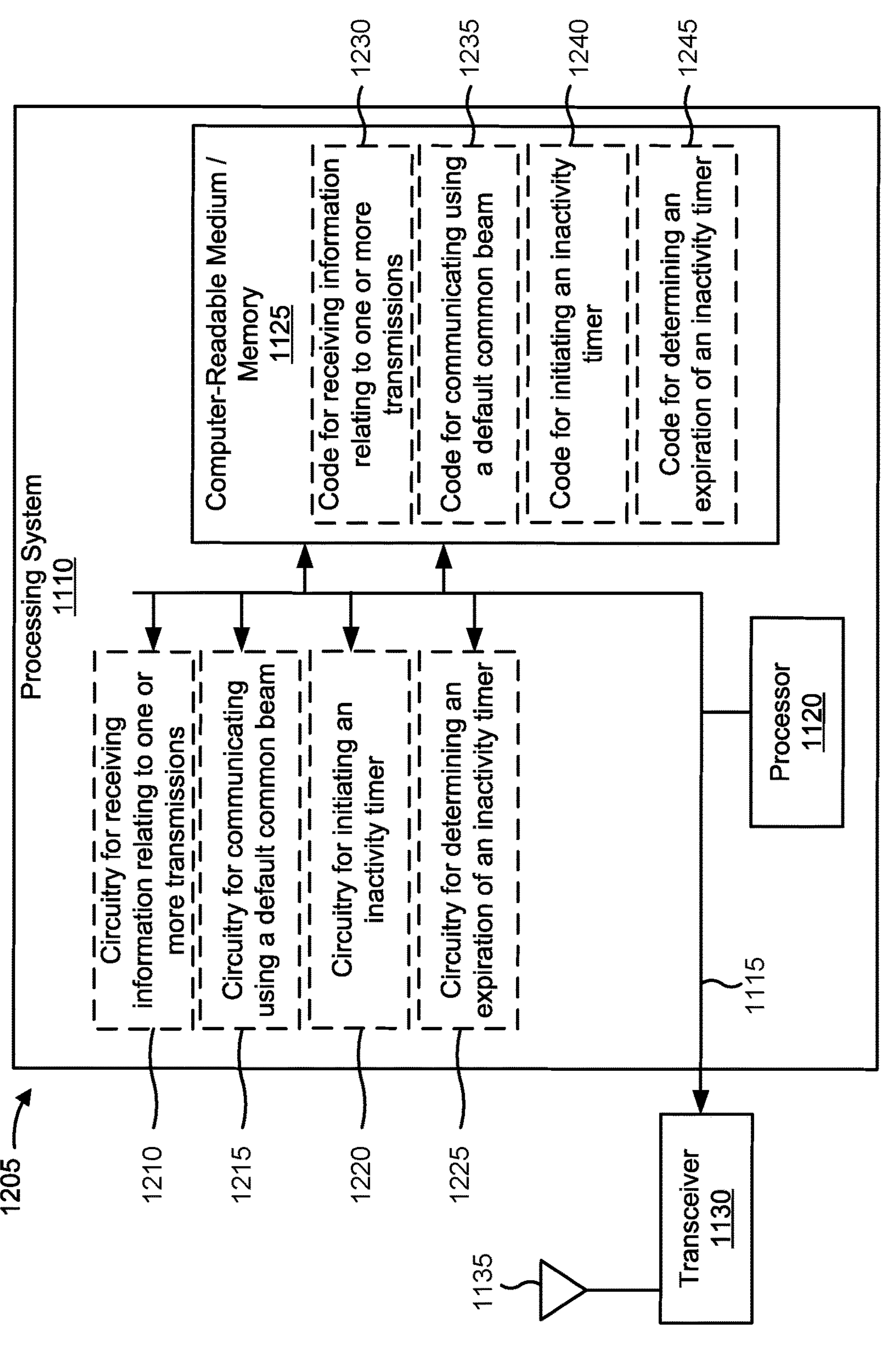
FIG. 12 is a diagram illustrating an example implementation of code and circuitry for an apparatus, in accordance with various aspects of the present disclosure.

FIG. 12 is a diagram illustrating an example 1200 of an implementation of code and circuitry for an apparatus 1205, in accordance with various aspects of the present disclosure. The apparatus 1205 may be a UE.

As further shown in FIG. 12, the apparatus may include circuitry for receiving information relating to one or more transmissions (circuitry 1210). For example, the apparatus may include circuitry to enable the apparatus to receive, from a base station, information relating to one or more transmissions to be transmitted or received.

As further shown in FIG. 12, the apparatus may include circuitry for communicating using a default common beam (circuitry 1215). For example, the apparatus may include circuitry to enable the apparatus to communicate with the base station using a default common beam for the one or more transmissions.

As further shown in FIG. 12, the apparatus may include circuitry for initiating an inactivity timer (circuitry 1220). For example, the apparatus may include circuitry to enable the apparatus to initiate an inactivity timer based at least in part on one or more of: receiving a PDCCH communication that indicates a downlink assignment for an active bandwidth part, receiving a PDCCH communication that indicates an uplink grant for an active bandwidth part, transmitting a MAC PDU in a configured uplink grant, receiving a MAC PDU in a configured downlink assignment, determining that a random access procedure for a serving cell is complete, or determining that a random access procedure for a serving cell is complete upon receiving a PDCCH communication. As another example, the apparatus may include circuitry to enable the apparatus to initiate an inactivity timer based at least in part on the apparatus entering a power saving mode.

As further shown in FIG. 12, the apparatus may include circuitry for determining an expiration of an inactivity timer (circuitry 1225). For example, the apparatus may include circuitry to enable the apparatus to determine an expiration of an inactivity timer.

As further shown in FIG. 12, the apparatus may include, stored in computer-readable medium 1125, code for receiving information relating to one or more transmissions (code 1230). For example, the apparatus may include code that, when executed by the processor 1120, may cause the processor 1120 to cause the transceiver 1130 to receive, from a base station, information relating to one or more transmissions to be transmitted or received.

As further shown in FIG. 12, the apparatus may include, stored in computer-readable medium 1125, code for communicating using a default common beam (code 1235). For example, the apparatus may include code that, when executed by the processor 1120, may cause the processor 1120 to cause the transceiver 1130 to communicate with the base station using a default common beam for the one or more transmissions.

As further shown in FIG. 12, the apparatus may include, stored in computer-readable medium 1125, code for initiating an inactivity timer (code 1240). For example, the apparatus may include code that, when executed by the processor 1120, may cause the processor 1120 to initiate an inactivity timer based at least in part on one or more of: receiving a PDCCH communication that indicates a downlink assignment for an active bandwidth part, receiving a PDCCH communication that indicates an uplink grant for an active bandwidth part, transmitting a MAC PDU in a configured uplink grant, receiving a MAC PDU in a configured downlink assignment, determining that a random access procedure for a serving cell is complete, or determining that a random access procedure for a serving cell is complete upon receiving a PDCCH communication. As another example, the apparatus may include code that, when executed by the processor 1120, may cause the processor 1120 to initiate an inactivity timer based at least in part on the apparatus entering a power saving mode.

As further shown in FIG. 12, the apparatus may include, stored in computer-readable medium 1125, code for determining an expiration of an inactivity timer (code 1245). For example, the apparatus may include code that, when executed by the processor 1120, may cause the processor 1120 to determine an expiration of an inactivity timer.

FIG. 12 is provided as an example. Other examples may differ from what is described in connection with FIG. 12.

Figure 13:
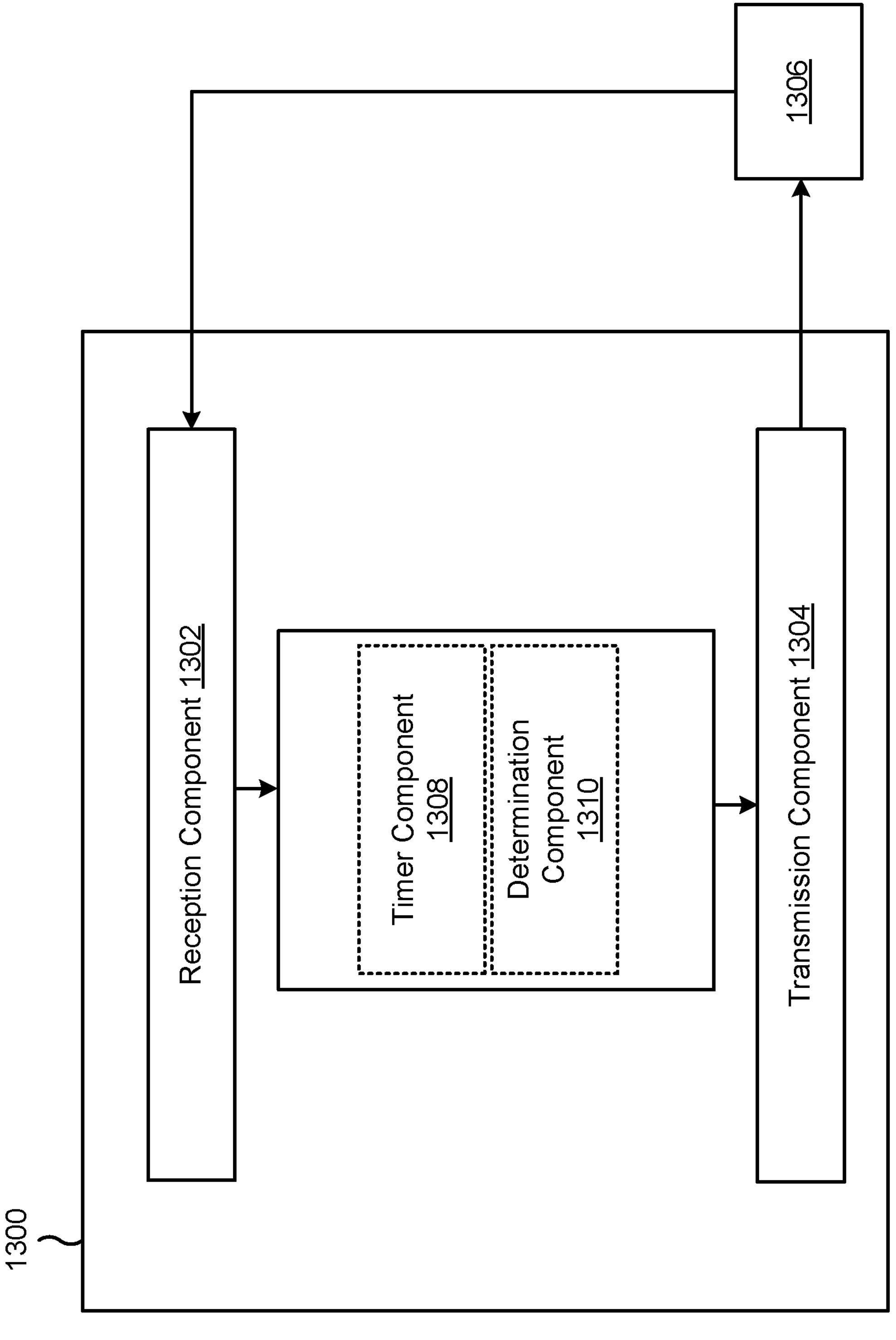
FIG. 13 is a block diagram of an example apparatus for wireless communication, in accordance with various aspects of the present disclosure.

FIG. 13 is a block diagram of an example apparatus 1300 for wireless communication, in accordance with various aspects of the present disclosure. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a timer component 1308 or a determination component 1310, among other examples.

In some aspects, the apparatus 1300 may be configured to perform one or more operations described herein in connection with FIG. 7. Additionally, or alternatively, the apparatus 1300 may be configured to perform one or more processes described herein, such as process 900 of FIG. 9, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2.

Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit, to a UE, information relating to one or more transmissions to be transmitted or received by the UE. The reception component 1302 and/or the transmission component 1304 may communicate with the UE using a default common beam for the one or more transmissions (e.g., based at least in part on a determination, such as by determination component 1310, of an expiration of an inactivity timer).

The timer component 1308 may initiate the inactivity timer. In some aspects, the timer component 1308 may initiate the inactivity timer based at least in part on receiving (e.g., by reception component 1302) an uplink communication for an active bandwidth part. In some aspects, the timer component 1308 may initiate the inactivity timer based at least in part on the UE entering a power saving mode.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
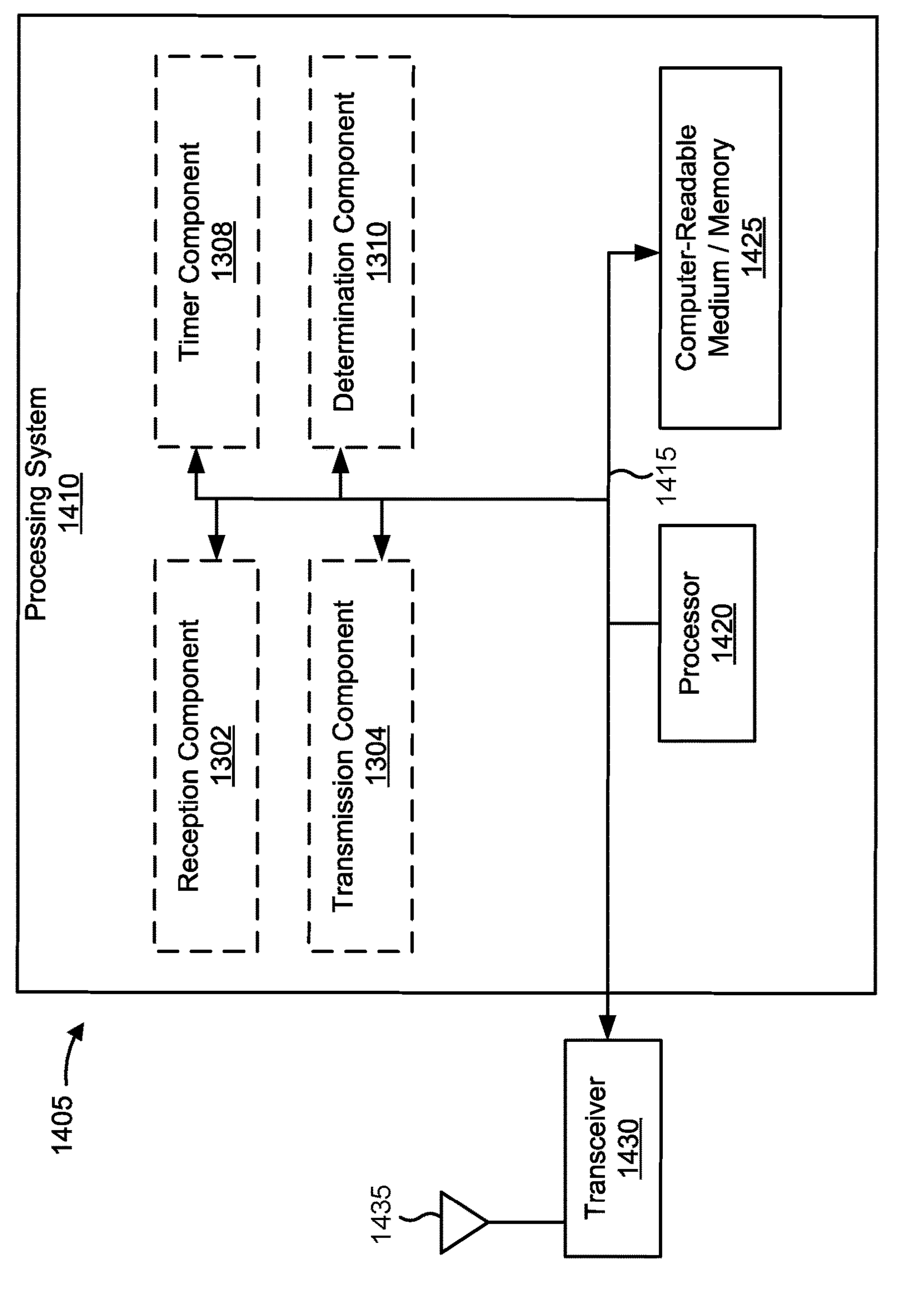
FIG. 14 is a diagram illustrating an example of a hardware implementation for an apparatus employing a processing system, in accordance with various aspects of the present disclosure.

FIG. 14 is a diagram illustrating an example 1400 of a hardware implementation for an apparatus 1405 employing a processing system 1410, in accordance with various aspects of the present disclosure. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, power management circuits, and/or the like.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the receive processor 238, and/or the controller/processor 240. In some aspects, the apparatus 1405 for wireless communication includes means for transmitting, to a UE, information relating to one or more transmissions to be transmitted or received by the UE, means for communicating with the UE using a default common beam for the one or more transmissions, means for initiating an inactivity timer, means for receiving an uplink communication for an active bandwidth part, or means for initiating the inactivity timer based at least in part on the UE entering a power saving mode. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
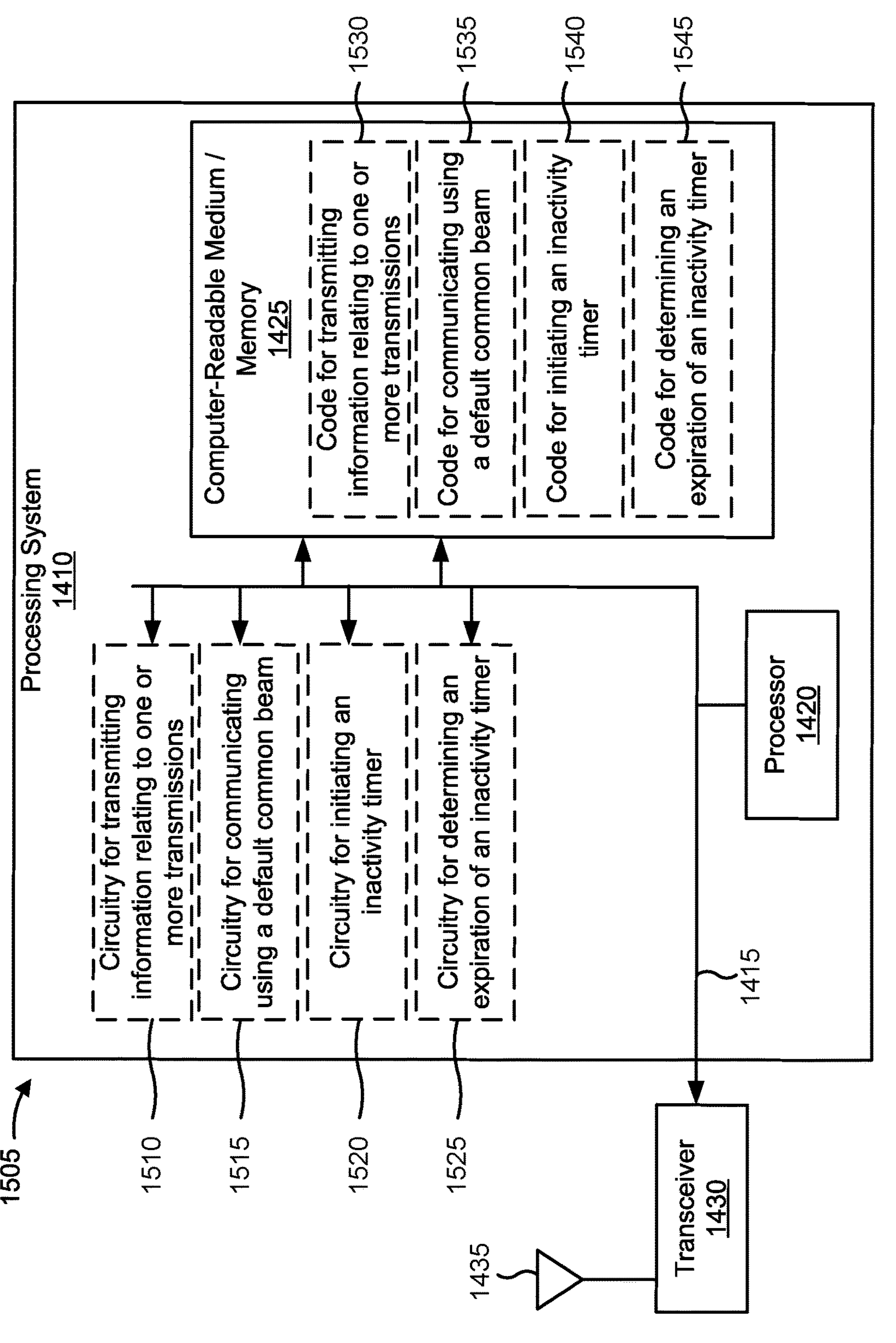
FIG. 15 is a diagram illustrating an example implementation of code and circuitry for an apparatus, in accordance with various aspects of the present disclosure.

FIG. 15 is a diagram illustrating an example 1500 of an implementation of code and circuitry for an apparatus 1505, in accordance with various aspects of the present disclosure. The apparatus 1505 may be a base station.

As further shown in FIG. 15, the apparatus may include circuitry for transmitting information relating to one or more transmissions (circuitry 1510). For example, the apparatus may include circuitry to enable the apparatus to transmit, to a UE, information relating to one or more transmissions to be transmitted or received.

As further shown in FIG. 15, the apparatus may include circuitry for communicating using a default common beam (circuitry 1515). For example, the apparatus may include circuitry to enable the apparatus to communicate with the UE using a default common beam for the one or more transmissions.

As further shown in FIG. 15, the apparatus may include circuitry for initiating an inactivity timer (circuitry 1520). For example, the apparatus may include circuitry to enable the apparatus to initiate an inactivity timer based at least in part on receiving an uplink communication for an active bandwidth part. As another example, the apparatus may include circuitry to enable the apparatus to initiate an inactivity timer based at least in part on the UE entering a power saving mode.

As further shown in FIG. 15, the apparatus may include circuitry for determining an expiration of an inactivity timer (circuitry 1525). For example, the apparatus may include circuitry to enable the apparatus to determine an expiration of an inactivity timer.

As further shown in FIG. 15, the apparatus may include, stored in computer-readable medium 1425, code for transmitting information relating to one or more transmissions (code 1530). For example, the apparatus may include code that, when executed by the processor 1420, may cause the processor 1420 to cause the transceiver 1430 to transmit, to a UE, information relating to one or more transmissions to be transmitted or received.

As further shown in FIG. 15, the apparatus may include, stored in computer-readable medium 1425, code for communicating using a default common beam (code 1535). For example, the apparatus may include code that, when executed by the processor 1420, may cause the processor 1420 to cause the transceiver 1430 to communicate with the UE using a default common beam for the one or more transmissions.

As further shown in FIG. 15, the apparatus may include, stored in computer-readable medium 1425, code for initiating an inactivity timer (code 1540). For example, the apparatus may include code that, when executed by the processor 1420, may cause the processor 1420 to initiate an inactivity timer based at least in part on receiving an uplink communication for an active bandwidth part. As another example, the apparatus may include code that, when executed by the processor 1420, may cause the processor 1420 to initiate an inactivity timer based at least in part on the UE entering a power saving mode.

As further shown in FIG. 15, the apparatus may include, stored in computer-readable medium 1425, code for determining an expiration of an inactivity timer (code 1545). For example, the apparatus may include code that, when executed by the processor 1420, may cause the processor 1420 to determine an expiration of an inactivity timer.

FIG. 15 is provided as an example. Other examples may differ from what is described in connection with FIG. 15.

The following provides an overview of some aspects of the present disclosure:

Aspect 1: A method of wireless communication performed by a user equipment (UE), comprising: receiving, from a base station, information relating to one or more transmissions to be transmitted or received by the UE; and communicating with the base station using a default common beam for the one or more transmissions.

Aspect 2: The method of aspect 1, wherein the default common beam is a common beam for: at least one downlink channel or reference signal and at least one uplink channel or reference signal, at least two downlink channels or reference signals, or at least two uplink channels or reference signals.

Aspect 3: The method of any of aspects 1-2, wherein the communicating with the base station comprises communicating with a single transmit receive point.

Aspect 4: The method of any of aspects 1-3, wherein the default common beam is associated with a particular common beam transmission configuration indicator state identifier in an active bandwidth part of a component carrier.

Aspect 5: The method of any of aspects 1-4, wherein the default common beam is associated with a particular reference signal in an active bandwidth part of a component carrier.

Aspect 6: The method of any of aspects 1-2, wherein communicating with the base station comprises communicating with multiple transmit receive points.

Aspect 7: The method of any of aspects 1-2 and 6, wherein the default common beam is for a transmit receive point, and the default common beam is associated with a particular common beam transmission configuration indicator state identifier associated with the transmit receive point in an active bandwidth part of a component carrier.

Aspect 8: The method of any of aspects 1-2 and 6-7, wherein the default common beam is for a transmit receive point, and the default common beam is associated with a particular reference signal associated with the transmit receive point in an active bandwidth part of a component carrier.

Aspect 9: The method of any of aspects 1-8, wherein the default common beam is used for the one or more transmissions based at least in part on an expiration of an inactivity timer.

Aspect 10: The method of any of aspects 1-9, further comprising: initiating the inactivity timer based at least in part on one or more of: receiving a physical downlink control channel (PDCCH) communication that indicates a downlink assignment for an active bandwidth part, receiving a PDCCH communication that indicates an uplink grant for an active bandwidth part, transmitting a medium access control (MAC) protocol data unit (PDU) in a configured uplink grant, receiving a MAC PDU in a configured downlink assignment, determining that a random access procedure for a serving cell is complete, or determining that a random access procedure for a serving cell is complete upon receiving a PDCCH communication.

Aspect 11: The method of any of aspects 1-10, further comprising: initiating the inactivity timer based at least in part on the UE entering a power saving mode.

Aspect 12: The method of any of aspects 1-11, wherein an application time for a beam is based at least in part on the expiration of the inactivity timer.

Aspect 13: The method of any of aspects 1-12, wherein the default common beam is used for the one or more transmissions on a downlink bandwidth part that is active at an expiration of an inactivity timer for the default common beam.

Aspect 14: The method of any of aspects 1-12, wherein the default common beam is used for the one or more transmissions on a default downlink bandwidth part.

Aspect 15: The method of any of aspects 1-14, wherein the one or more transmissions include transmissions for one or more of a physical downlink control channel, or a physical downlink shared channel, or a physical uplink control channel, or a physical uplink shared channel, or a synchronization signal block, or a channel state information reference signal, or a positioning reference signal, or a sounding reference signal.

Aspect 16: The method of any of aspects 1-15, wherein a beam failure detection reference signal that is to be used by the UE when the default common beam is used by the UE is: a quasi-co-location (QCL) reference signal associated with an indicated beam, a QCL reference signal associated with the default common beam, the QCL reference signal associated with the indicated beam and the QCL reference signal associated with the default common beam, or a QCL reference signal associated with a particular control resource set in an active bandwidth part.

Aspect 17: The method of any of aspects 1-15, wherein the UE is to cease one or more beam failure detection operations when the default common beam is used by the UE.

Aspect 18: A method of wireless communication performed by a base station, comprising: transmitting, to a user equipment (UE), information relating to one or more transmissions to be transmitted or received by the UE; and communicating with the UE using a default common beam for the one or more transmissions.

Aspect 19: The method of aspect 18, wherein the default common beam is a common beam for: at least one downlink channel or reference signal and at least one uplink channel or reference signal, at least two downlink channels or reference signals, or at least two uplink channels or reference signals.

Aspect 20: The method of any of aspects 18-19, wherein the UE is communicating with a single transmit receive point.

Aspect 21: The method of any of aspects 18-20, wherein the default common beam is associated with a particular common beam transmission configuration indicator state identifier in an active bandwidth part of a component carrier.

Aspect 22: The method of any of aspects 18-21, wherein the default common beam is associated with a particular reference signal in an active bandwidth part of a component carrier.

Aspect 23: The method of any of aspects 18-19, wherein the UE is communicating with multiple transmit receive points.

Aspect 24: The method of any of aspects 18-19 and 23, wherein the default common beam is for a transmit receive point, and the default common beam is associated with a particular common beam transmission configuration indicator state identifier associated with the transmit receive point in an active bandwidth part of a component carrier.

Aspect 25: The method of any of aspects 18-19 and 23-24, wherein the default common beam is for a transmit receive point, and the default common beam is associated with a particular reference signal associated with the transmit receive point in an active bandwidth part of a component carrier.

Aspect 26: The method of any of aspects 18-25, wherein the default common beam is used for the one or more transmissions based at least in part on an expiration of an inactivity timer.

Aspect 27: The method of any of aspects 18-26, further comprising: initiating the inactivity timer based at least in part on receiving an uplink communication for an active bandwidth part.

Aspect 28: The method of any of aspects 18-27, further comprising: initiating the inactivity timer based at least in part on the UE entering a power saving mode.

Aspect 29: The method of any of aspects 18-28, wherein an application time for a beam is based at least in part on the expiration of the inactivity timer.

Aspect 30: The method of any of aspects 18-29, wherein the default common beam is used for the one or more transmissions on a downlink bandwidth part that is active at an expiration of an inactivity timer for the default common beam.

Aspect 31: The method of any of aspects 18-29, wherein the default common beam is used for the one or more transmissions on a default downlink bandwidth part.

Aspect 32: The method of any of aspects 18-31, wherein the one or more transmissions include transmissions for one or more of a physical downlink control channel, or a physical downlink shared channel, or a physical uplink control channel, or a physical uplink shared channel, or a synchronization signal block, or a channel state information reference signal, or a positioning reference signal, or a sounding reference signal.

Aspect 33: The method of any of aspects 18-32, wherein a beam failure detection reference signal that is to be used by the UE when the default common beam is used is: a quasi-co-location (QCL) reference signal associated with an indicated beam, a QCL reference signal associated with the default common beam, the QCL reference signal associated with the indicated beam and the QCL reference signal associated with the default common beam, or a QCL reference signal associated with a particular control resource set in an active bandwidth part.

Aspect 34: The method of any of aspects 18-32, wherein the UE is to cease one or more beam failure detection operations when the default common beam is used.

Aspect 35: An apparatus for wireless communication at a device, comprising a processor; memory coupled with the processor; and instructions stored in the memory and executable by the processor to cause the apparatus to perform the method of one or more aspects of aspects 1-17.

Aspect 36: A device for wireless communication, comprising a memory and one or more processors coupled to the memory, the memory and the one or more processors configured to perform the method of one or more aspects of aspects 1-17.

Aspect 37: An apparatus for wireless communication, comprising at least one means for performing the method of one or more aspects of aspects 1-17.

Aspect 38: A non-transitory computer-readable medium storing code for wireless communication, the code comprising instructions executable by a processor to perform the method of one or more aspects of aspects 1-17.

Aspect 39: A non-transitory computer-readable medium storing a set of instructions for wireless communication, the set of instructions comprising one or more instructions that, when executed by one or more processors of a device, cause the device to perform the method of one or more aspects of aspects 1-17.

Aspect 40: An apparatus for wireless communication at a device, comprising a processor; memory coupled with the processor; and instructions stored in the memory and executable by the processor to cause the apparatus to perform the method of one or more aspects of aspects 18-34.

Aspect 41: A device for wireless communication, comprising a memory and one or more processors coupled to the memory, the memory and the one or more processors configured to perform the method of one or more aspects of aspects 18-34.

Aspect 42: An apparatus for wireless communication, comprising at least one means for performing the method of one or more aspects of aspects 18-34.

Aspect 43: A non-transitory computer-readable medium storing code for wireless communication, the code comprising instructions executable by a processor to perform the method of one or more aspects of aspects 18-34.

Aspect 44: A non-transitory computer-readable medium storing a set of instructions for wireless communication, the set of instructions comprising one or more instructions that, when executed by one or more processors of a device, cause the device to perform the method of one or more aspects of aspects 18-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories storing processor-executable code; and one or more processors coupled with the one or more memories and individually or collectively operable to cause the UE to:

receive information relating to one or more transmissions to be transmitted or received by the UE; and communicate via a default common beam for the one or more transmissions based at least in part on an expiration of an inactivity timer, wherein the default common beam is associated with:

a particular common beam transmission configuration indicator state identifier in an active bandwidth part of a component carrier, a particular reference signal in the active bandwidth part of the component carrier, or both the particular common beam transmission configuration indicator state identifier and the particular reference signal.

2. The apparatus of claim 1, wherein the default common beam is a common beam for one of:

at least one downlink channel or reference signal and at least one uplink channel or reference signal, at least two downlink channels or reference signals, or at least two uplink channels or reference signals.

3. The apparatus of claim 1, wherein the default common beam is associated with the particular common beam transmission configuration indicator state identifier in the active bandwidth part of the component carrier.

4. The apparatus of claim 1, wherein the default common beam is associated with the particular reference signal in the active bandwidth part of the component carrier.

5. The apparatus of claim 1, wherein the default common beam is for a transmit receive point, and wherein the particular common beam transmission configuration indicator state identifier is associated with the transmit receive point in the active bandwidth part of the component carrier.

6. The apparatus of claim 1, wherein the default common beam is for a transmit receive point, and wherein the particular reference signal is associated with the transmit receive point in the active bandwidth part of the component carrier.

7. The apparatus of claim 1, wherein the one or more processors are individually or collectively operable to cause the UE to:

initiate the inactivity timer based at least in part on one or more of:

a reception of a physical downlink control channel (PDCCH) communication that indicates a downlink assignment for the active bandwidth part, a reception of a PDCCH communication that indicates an uplink grant for the active bandwidth part, a transmission of a medium access control (MAC) protocol data unit (PDU) in a configured uplink grant, a reception of a MAC PDU in a configured downlink assignment, a determination that a random access procedure for a serving cell is complete, or a determination that a random access procedure for a serving cell is complete upon receiving a PDCCH communication.

8. The apparatus of claim 1, wherein the one or more processors are individually or collectively operable to cause the UE to:

initiate the inactivity timer based at least in part on the UE entering a power saving mode.

9. The apparatus of claim 1, wherein an application time for a beam is based at least in part on the expiration of the inactivity timer.

10. The apparatus of claim 1, wherein the default common beam is configured for the one or more transmissions on a downlink bandwidth part that is active at the expiration of the inactivity timer for the default common beam.

11. The apparatus of claim 1, wherein the default common beam is configured for the one or more transmissions on a default downlink bandwidth part.

12. The apparatus of claim 1, wherein the one or more transmissions include transmissions for one or more of a physical downlink control channel, a physical downlink shared channel, a physical uplink control channel, a physical uplink shared channel, a synchronization signal block, a channel state information reference signal, a positioning reference signal, or a sounding reference signal.

13. The apparatus of claim 1, wherein a beam failure detection reference signal, that is configured for the UE when the default common beam is configured for the UE, is one of:

a quasi-co-location (QCL) reference signal associated with an indicated beam, a QCL reference signal associated with the default common beam, the QCL reference signal associated with the indicated beam and the QCL reference signal associated with the default common beam, or a QCL reference signal associated with a particular control resource set in the active bandwidth part.

14. The apparatus of claim 1, wherein the UE is to cease one or more beam failure detection operations when the default common beam is configured for the UE.

15. An apparatus for wireless communication at a network entity, comprising:

one or more memories storing processor-executable code; and one or more processors coupled with the one or more memories and individually or collectively operable to cause the network entity to:

transmit information relating to one or more transmissions associated with a user equipment (UE); and communicate via a default common beam for the one or more transmissions based at least in part on an expiration of an inactivity timer, wherein the default common beam is associated with:

a particular common beam transmission configuration indicator state identifier in an active bandwidth part of a component carrier, a particular reference signal in the active bandwidth part of the component carrier, or both the particular common beam transmission configuration indicator state identifier and the particular reference signal.

16. The apparatus of claim 15, wherein the default common beam is a common beam for one of:

at least one downlink channel or reference signal and at least one uplink channel or reference signal, at least two downlink channels or reference signals, or at least two uplink channels or reference signals.

17. The apparatus of claim 15, wherein the default common beam is associated with the particular common beam transmission configuration indicator state identifier in the active bandwidth part of the component carrier.

18. The apparatus of claim 15, wherein the default common beam is associated with the particular reference signal in the active bandwidth part of the component carrier.

19. The apparatus of claim 15, wherein the default common beam is for a transmit receive point, and wherein the particular common beam transmission configuration indicator state identifier is associated with the transmit receive point in the active bandwidth part of the component carrier.

20. The apparatus of claim 15, wherein the default common beam is for a transmit receive point, and wherein the particular reference signal is associated with the transmit receive point in the active bandwidth part of the component carrier.

21. The apparatus of claim 15, wherein the active bandwidth part is a downlink bandwidth part that is active at the expiration of the inactivity timer for the default common beam.

22. The apparatus of claim 15, wherein the active bandwidth part is a default downlink bandwidth part.

23. The apparatus of claim 15, wherein the one or more transmissions include transmissions for one or more of a physical downlink control channel, a physical downlink shared channel, a physical uplink control channel, a physical uplink shared channel, a synchronization signal block, a channel state information reference signal, a positioning reference signal, or a sounding reference signal.

24. A method of wireless communication performed at a user equipment (UE), comprising:

receiving information relating to one or more transmissions to be transmitted or received by the UE; and communicating using a default common beam for the one or more transmissions based at least in part on an expiration of an inactivity timer, the default common beam being associated with:

a particular common beam transmission configuration indicator state identifier in an active bandwidth part of a component carrier, a particular reference signal in the active bandwidth part of the component carrier, or both the particular common beam transmission configuration indicator state identifier and the particular reference signal.

25. The method of claim 24, wherein the default common beam is associated with the particular common beam transmission configuration indicator state identifier in the active bandwidth part of the component carrier.

26. The method of claim 24, wherein the default common beam is associated with the particular reference signal in the active bandwidth part of the component carrier.

27. The method of claim 24, wherein the default common beam is for a transmit receive point, and wherein the particular common beam transmission configuration indicator state identifier is associated with the transmit receive point in the active bandwidth part of the component carrier.

28. The method of claim 24, wherein the default common beam is for a transmit receive point, and wherein the particular reference signal is associated with the transmit receive point in the active bandwidth part of the component carrier.

29. The method of claim 24, wherein the default common beam is a common beam for one of:

at least one downlink channel or reference signal and at least one uplink channel or reference signal, at least two downlink channels or reference signals, or at least two uplink channels or reference signals.

30. The method of claim 24, further comprising:

initiating the inactivity timer based at least in part on one or more of:

a reception of a physical downlink control channel (PDCCH) communication that indicates a downlink assignment for the active bandwidth part, a reception of a PDCCH communication that indicates an uplink grant for the active bandwidth part, a transmission of a medium access control (MAC) protocol data unit (PDU) in a configured uplink grant, a reception of a MAC PDU in a configured downlink assignment, a determination that a random access procedure for a serving cell is complete, or a determination that a random access procedure for a serving cell is complete upon receiving a PDCCH communication.

31. The method of claim 24, further comprising:

initiating the inactivity timer based at least in part on the UE entering a power saving mode.

32. The method of claim 24, wherein an application time for a beam is based at least in part on the expiration of the inactivity timer.

33. A method of wireless communication performed at a network entity, comprising:

transmitting information relating to one or more transmissions associated with a user equipment (UE); and communicating using a default common beam for the one or more transmissions based at least in part on an expiration of an inactivity timer, the default common beam being associated with:

a particular common beam transmission configuration indicator state identifier in an active bandwidth part of a component carrier, a particular reference signal in the active bandwidth part of the component carrier, or both the particular common beam transmission configuration indicator state identifier and the particular reference signal.

34. The method of claim 33, wherein the default common beam is associated with the particular common beam transmission configuration indicator state identifier in the active bandwidth part of the component carrier.

35. The method of claim 33, wherein the default common beam is associated with the particular reference signal in the active bandwidth part of the component carrier.

* * * * *